(12) United States Patent
Sun et al.

(10) Patent No.: US 12,170,994 B2
(45) Date of Patent: Dec. 17, 2024

(54) METHOD AND DEVICE FOR TRANSMITTING AND RECEIVING SIGNALS

(71) Applicant: Samsung Electronics Co., Ltd., Suwon-si (KR)

(72) Inventors: Feifei Sun, Beijing (CN); Yi Wang, Beijing (CN); Qi Xiong, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/146,303

(22) Filed: Dec. 23, 2022

(65) Prior Publication Data

US 2023/0131212 A1 Apr. 27, 2023

Related U.S. Application Data

(63) Continuation of application No. 17/389,227, filed on Jul. 29, 2021, now abandoned.

(30) Foreign Application Priority Data

Jul. 31, 2020 (CN) .......................... 202010763441.2
Apr. 1, 2021 (CN) .......................... 202110357638.0

(51) Int. Cl.
*H04W 72/1263* (2023.01)
*H04L 1/1867* (2023.01)
(Continued)

(52) U.S. Cl.
CPC ....... *H04W 72/1263* (2013.01); *H04L 1/1896* (2013.01); *H04W 8/24* (2013.01);
(Continued)

(58) Field of Classification Search
CPC ... H04W 72/1263; H04W 72/54; H04W 8/24; H04W 72/0446; H04W 74/0841; H04L 1/1896
See application file for complete search history.

(56) References Cited

U.S. PATENT DOCUMENTS 10,637,550 B2 4/2020 Park et al.
2014/0307611 A1 10/2014 Tesanovic et al.
(Continued)

FOREIGN PATENT DOCUMENTS

JP 2018501735 A 1/2018
WO 2020032746 A1 2/2020
(Continued)

OTHER PUBLICATIONS

Supplementary European Search Report dated Oct. 31, 2023, in connection with European Application No. 21850767.1, 108 pages.
(Continued)

*Primary Examiner* — Michael Thier
*Assistant Examiner* — Nevena Zecevic Sandhu

(57) ABSTRACT

The disclosure relates to a communication method and system for converging a 5th-Generation (5G) communication system for supporting higher data rates beyond a 4th-Generation (4G) system with a technology for Internet of Things (IoT). The disclosure may be applied to intelligent services based on the 5G communication technology and the IoT-related technology, such as smart home, smart building, smart city, smart car, connected car, health care, digital education, smart retail, security and safety services. A method performed by a user equipment (UE) comprises transmitting, to a base station, a random access preamble and capability information of the UE; receiving, from the base station, a random access response including time domain scheduling information being based on the capability information; and transmitting, to the base station, data based on the time domain scheduling information.

12 Claims, 20 Drawing Sheets

(51) Int. Cl.
  *H04W 8/24* (2009.01)
  *H04W 72/0446* (2023.01)
  *H04W 72/54* (2023.01)
  *H04W 74/0833* (2024.01)

(52) U.S. Cl.
  CPC ....... *H04W 72/0446* (2013.01); *H04W 72/54* (2023.01); *H04W 74/0841* (2013.01)

(56) References Cited

U.S. PATENT DOCUMENTS

| | | |
|---|---|---|
| 2018/0034525 A1 | 2/2018 | Park et al. |
| 2018/0152924 A1 | 5/2018 | Ouchi |
| 2019/0014562 A1 | 1/2019 | Yasukawa et al. |
| 2019/0149253 A1* | 5/2019 | Yoon .................... H04B 7/2621 370/252 |
| 2019/0274117 A1 | 9/2019 | Zhang et al. |
| 2020/0029343 A1 | 1/2020 | Wang et al. |
| 2020/0229237 A1 | 7/2020 | Kim et al. |
| 2021/0360667 A1* | 11/2021 | Moon .................... H04L 5/0051 |
| 2022/0217661 A1* | 7/2022 | Yokomakura .......... H04B 7/155 |
| 2022/0247534 A1* | 8/2022 | Hu ........................ H04L 5/0007 |
| 2022/0279563 A1 | 9/2022 | Wei et al. |
| 2022/0377532 A1* | 11/2022 | He ........................ H04W 48/12 |

FOREIGN PATENT DOCUMENTS

| | | |
|---|---|---|
| WO | 2020091518 A1 | 5/2020 |
| WO | 2020145480 A1 | 7/2020 |

OTHER PUBLICATIONS

International Search Report and Written Opinion of the International Searching Authority in connection with International Application No. PCT/KR2021/009556 issued Oct. 26, 2021, 8 pages.

* cited by examiner

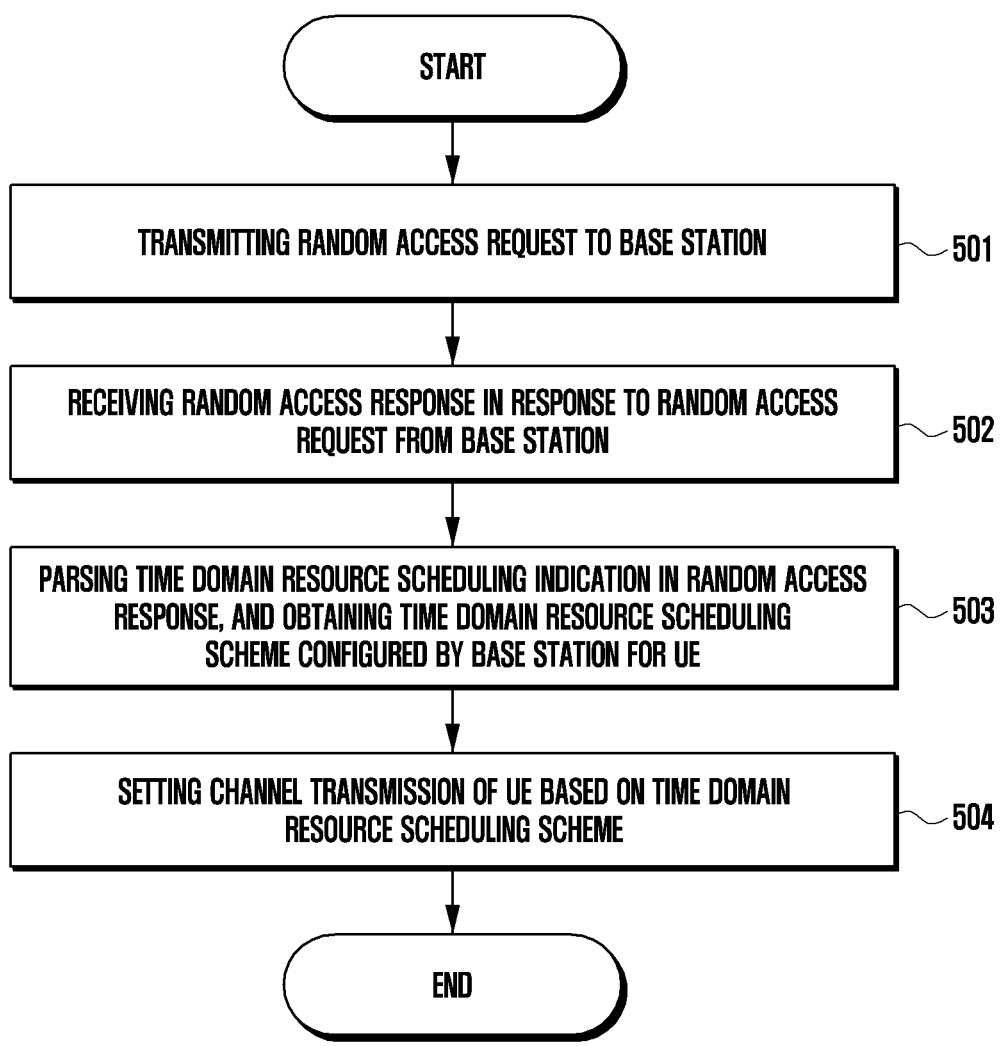

METHOD AND DEVICE FOR TRANSMITTING AND RECEIVING SIGNALS

CROSS-REFERENCE TO RELATED APPLICATIONS

This application is a continuation of application Ser. No. 17/389,227, filed Jul. 29, 2021, which is based on and claims priority under 35 U. S.C. § 119(a) to Chinese Patent Application No. 202010763441.2 filed on Jul. 31, 2020, Chinese Patent Application No. 202110357638.0 filed on Apr. 1, 2021, in the China National Intellectual Property Administration, the disclosures of which are herein incorporated by reference in their entirety.

BACKGROUND

1. Field

The disclosure relates to the field of wireless communication technology, and more specifically, to a method and device for transmitting and receiving signals in a wireless communication network.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Compared with 5G systems, 6G systems may be implemented in higher frequency bands to achieve a higher data rate.

As estimated by ITU, global monthly mobile data traffic will reach 62 Exa Bytes (1 EB=230 GB) by 2020, and from 2020 to 2030, global mobile data services will grow at an annual rate of about 55%. In addition, proportions of video services and machine-to-machine communication services in mobile data services will gradually increase. By 2030, video services will be six times of non-video services, while machine-to-machine communication services will account for about 12% of mobile data services ("IMT Traffic Estimates for the Years 2020 to 2030, Report ITU-R M.2370-0").

The rapid growth of mobile data services, especially the exponential growth of high-definition video and ultra-high-definition video services, puts forward higher requirements for a transmission rate of wireless communication. In order to meet the growing demand for mobile services, new technologies need to be proposed on the basis of 4G, 5G or 6G to further improve the transmission rate and throughput of wireless communication systems.

In order to adapt to the development of the Internet of things, Rel-17 NR is doing research on reduced capability (RedCap). In the learning of low capability machine type communication (MTC) in Rel-11 LTE, two types of half duplex frequency division duplex (HD-FDD) (Type A HD-FDD and Type B HD-FDD) are analyzed. Type A HD-FDD has two oscillators, so the handover between uplink and downlink can be completed in a very short time. However, Type B HD-FDD has only one oscillator. Due to the different uplink and downlink frequencies of the FDD system, a 1 millisecond gap is needed before switching between uplink and downlink.

The current NR system does not support the UE of HD-FDD. Therefore, in order to support the UE of HD-FDD, additional improvements are needed, to avoid different understanding of the reception and transmission time between the base station and UE, so as to ensure the transmission and reception performance of the uplink and downlink channels and signals.

SUMMARY

In an embodiment of the disclosure, a method performed by a user equipment (UE) in a wireless communication system is provided, including: transmitting a first message to a base station; receiving a second message in response to the first message from the base station; parsing a time domain resource scheduling indication in the second message to obtain a time domain resource scheduling scheme configured by the base station for the UE; and setting a channel transmission of the UE based on the time domain resource scheduling indication.

In an embodiment of the disclosure, the step of transmitting the first message to the base station comprises: in the case that the first message contains information on the UE capabilities of the UE, including, by the UE, information on the UE capabilities of the UE in the first message by one of the following ways: transmitting, by the UE, based on a mapping relationship predefined or pre-configured by the base station between the UE capabilities and resources for transmitting the first message, the first message through the resources for transmitting the first message, to which the UE capabilities of the UE are mapped; and including, by the UE, the UE capabilities of the UE in an uplink channel in the first message.

In an embodiment of the disclosure, the UE capabilities includes at least one of: a duplex mode, uplink and downlink transition time, retuning time, PUSCH additional delay time, PDSCH additional delay time, PUCCH additional delay time, time from PDCCH scheduling to PUSCH transmission, time from PDCCH scheduling to PDSCH reception, time from PDSCH reception to ACK/NACK feedback, time from CSI triggering to reporting, time from CSI measuring to reporting, a polarization type of UE antennas, or a number of UE antennas.

In an embodiment of the disclosure, in the case that the first message contains information on the UE capabilities of the UE, based on the mapping relationship predefined or pre-configured by the base station between the UE capabilities and resources for receiving the second message, the UE receives the second message through the resources for receiving the second message, to which the UE capabilities of the UE are mapped, and/or in the case that the first message does not contain information on the UE capabilities of the UE, the second message is received by one of the following ways: based on the mapping relationship between the UE capabilities and the resources for receiving the second message, the UE receives the second message through the resources for receiving the second message, to which the UE capabilities of the UE are mapped; and based on the mapping relationship between the UE capabilities and the resources for receiving the second message, the UE receives the second message through the resources for receiving the second message, to which the worst UE capabilities predefined or supported by the base station configurations are mapped, and wherein, the resources for receiving the second message are at least one of a start position of a second message window, a length of the second message window, a RNTI for descrambling the second message, a PDCCH search space, and a control resource set (CORESET).

In an embodiment of the disclosure, the steps of parsing the time domain resource scheduling indication in the second message by the UE comprises: determining, by the UE, a time domain resource scheduling table for parsing the time domain resource scheduling indication, and parsing the time domain resource scheduling indication by the determined time domain resource scheduling table, and, in the case that the first message contains information on the UE capabilities of the UE, the UE determines the time domain resource scheduling table for parsing the time domain resource scheduling indication in one of the following ways: the UE determines a time domain resource scheduling table to which the UE capabilities of the UE are mapped as the time domain resource scheduling table for parsing the time domain resource scheduling indication, based on the mapping relationship predefined or pre-configured by the base station between the UE capabilities and the time domain resource scheduling tables; and the UE obtains an indication of the time domain resource scheduling table from the second message and determines the indicated time domain resource scheduling table as the time domain resource scheduling table for parsing the time domain resource scheduling indication, and/or in the case that the first message does not contain the information on the UE capabilities, the UE determines the time domain resource scheduling table for parsing the time domain resource scheduling indication by one of the following ways: the UE determines a time domain resource scheduling table to which worst UE capabilities predefined or supported by the base configurations are mapped as the time domain resource scheduling table for parsing the time domain resource scheduling indication, based on the mapping relationship predefined or pre-configured by the base station between the UE capabilities and the time domain resource scheduling tables; the UE determines a time domain resource scheduling table to which the UE capabilities of the UE are mapped as the time domain resource scheduling table for parsing the time domain resource scheduling indication, based on the mapping relationship predefined or pre-configured by the base station between the UE capabilities and the time domain resource scheduling tables; and the UE obtains an indication of the time domain resource scheduling table from the second message and determines the indicated time domain resource scheduling table as the time domain resource scheduling table for parsing the time domain resource scheduling indication.

In an embodiment of the disclosure, the second message is a random access response (RAR).

In an embodiment of the disclosure, the time domain resource scheduling scheme includes at least one of: at least one time interval, priority between the at least one time interval and channel transmissions of the UE, and priority between channel transmissions of the UE, and wherein, the at least one time interval includes at least one of: uplink and downlink transition time, retuning time, PUSCH additional delay time, PDSCH additional delay time, PUCCH additional delay time, time from PDCCH scheduling to PUSCH transmission, time from PDCCH scheduling to PDSCH reception, time from PDSCH reception to ACK/NACK feedback, time from CSI triggering to reporting, or time from CSI measuring to reporting.

In an embodiment of the disclosure, the step of setting channel transmission of the UE based on the time domain resource scheduling scheme comprises: setting, by the UE, the at least one time interval by one of the following methods: setting, by the UE, the at least one time interval between symbols in a transmission block of a channel; or replacing, by the UE, a symbol in the transmission block of the channel with the at least one time interval.

In yet another embodiment of the disclosure, a method performed by a base station communicating with a user equipment (UE) in a wireless communication system is provided, wherein the method includes: receiving, by the base station, a first message from the UE; configuring, by the base station a time domain resource scheduling scheme for the UE based on the first message; and transmitting, by the base station, a second message to the UE including a time domain resource scheduling indication indicating the time domain resource scheduling scheme, and wherein, the base station configures the time domain resource scheduling scheme for the UE further considering UE capability.

In an embodiment of the disclosure, the UE capabilities includes at least one of: a duplex mode, uplink and downlink transition time, retuning time, PUSCH additional delay time, PDSCH additional delay time, PUCCH additional delay time, time from PDCCH scheduling to PUSCH transmission, time from PDCCH scheduling to PDSCH reception, time from PDSCH reception to ACK/NACK feedback, time from CSI triggering to reporting, time from CSI measuring to reporting, a polarization type of UE antennas, or a number of UE antennas.

In an embodiment of the disclosure, in the case that the first message contains information on UE capabilities of the UE, the step of configuring the time domain resource scheduling scheme for the UE based on the first message comprises: determining, by the base station, the UE capabilities of the UE from the first message of the UE in one of the following ways: based on a mapping relationship predefined or pre-configured by the base station between the UE capabilities and the resources for transmitting the first message, determining, by the base station, the UE capabilities of the UE through transmission resources where the received first message transmitting the UE capabilities of the UE is; and acquiring, by the base station, the UE capabilities of the UE included in the uplink channel in the first message of the UE.

In an embodiment of the disclosure, the second message is a random access response (RAR).

In an embodiment of the disclosure, the time domain resource scheduling scheme includes at least one of: at least one time interval, priority between the at least one time interval and channel transmissions of UE, and priority between channel transmissions of UE, and wherein the at least one time interval includes at least one of: uplink and downlink transition time, retuning time, PUSCH additional delay time, PDSCH additional delay time, PUCCH additional delay time, time from PDCCH scheduling to PUSCH transmission, time from PDCCH scheduling to PDSCH reception, time from PDSCH reception to ACK/NACK feedback, time from CSI triggering to reporting time, or time from CSI measuring to reporting.

In yet another embodiment of the disclosure, a user equipment (UE) in a wireless communication network is provided, the UE including: a transceiver, configured to transmit and receive signals with the outside; and a processor, configured to control the transceiver to perform: transmitting a first message to a base station; receiving a second message in response to the first message from the base station; and parsing a time domain resource scheduling indication in the second message to obtain a time domain resource scheduling scheme configured by the base station for the UE; and setting channel transmission of UE based on the time domain resource scheduling indication.

In yet another embodiment of the disclosure, there is provided a base station in a wireless communication network, which includes: a transceiver, configured to transmit and receive signals with the outside; and a processor, configured to control the transceiver to perform: receiving a first message from a UE; configuring a time domain resource scheduling scheme for the UE based on the first message; and transmitting a second message to the UE including a time domain resource scheduling indication indicating the time domain resource scheduling scheme, and wherein, the base station configures a time domain resource scheduling scheme for the UE further considering UE capability.

In yet another embodiment of the disclosure, a method performed by a UE in a communication system is provided. The method includes: transmitting, to a base station, a random access preamble and capability information of the UE; receiving, from the base station, a random access response including time domain scheduling information being based on the capability information; and transmitting, to the base station, data based on the time domain scheduling information.

In yet another embodiment of the disclosure, a method performed by a base station in a communication system is provided. The method includes: receiving, from a user equipment (UE), a random access preamble and capability information of the UE; identifying time domain scheduling information based on the capability information; and transmitting, to the UE, a random access response including the time domain scheduling information.

In yet another embodiment of the disclosure, a UE in a communication system is provided. The UE comprising: a transceiver; and a processor configured to: transmit, to a base station via the transceiver, a random access preamble and capability information of the UE, receive, from the base station via the transceiver, a random access response including time domain scheduling information being based on the capability information, and transmit, to the base station via the transceiver, data based on the time domain scheduling information.

In still another embodiment of the disclosure, a base station in a communication system is provided. The base station comprising: a transceiver; and a processor configured to: receive, from a user equipment (UE) via the transceiver, a random access preamble and capability information of the UE, identify time domain scheduling information based on the capability information, and transmit, to the UE via the transceiver, a random access response including the time domain scheduling information.

According to the embodiments of the disclosure, an efficiency of UEs with different UE capabilities can be improved, an impact on high-capacity UEs can be reduced or eliminated, and a performance of different UE capabilities can be ensured when satisfying the UE capabilities.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 5 illustrates a method performed by a user equipment (UE) in a wireless communication system according to an embodiment of the disclosure;

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
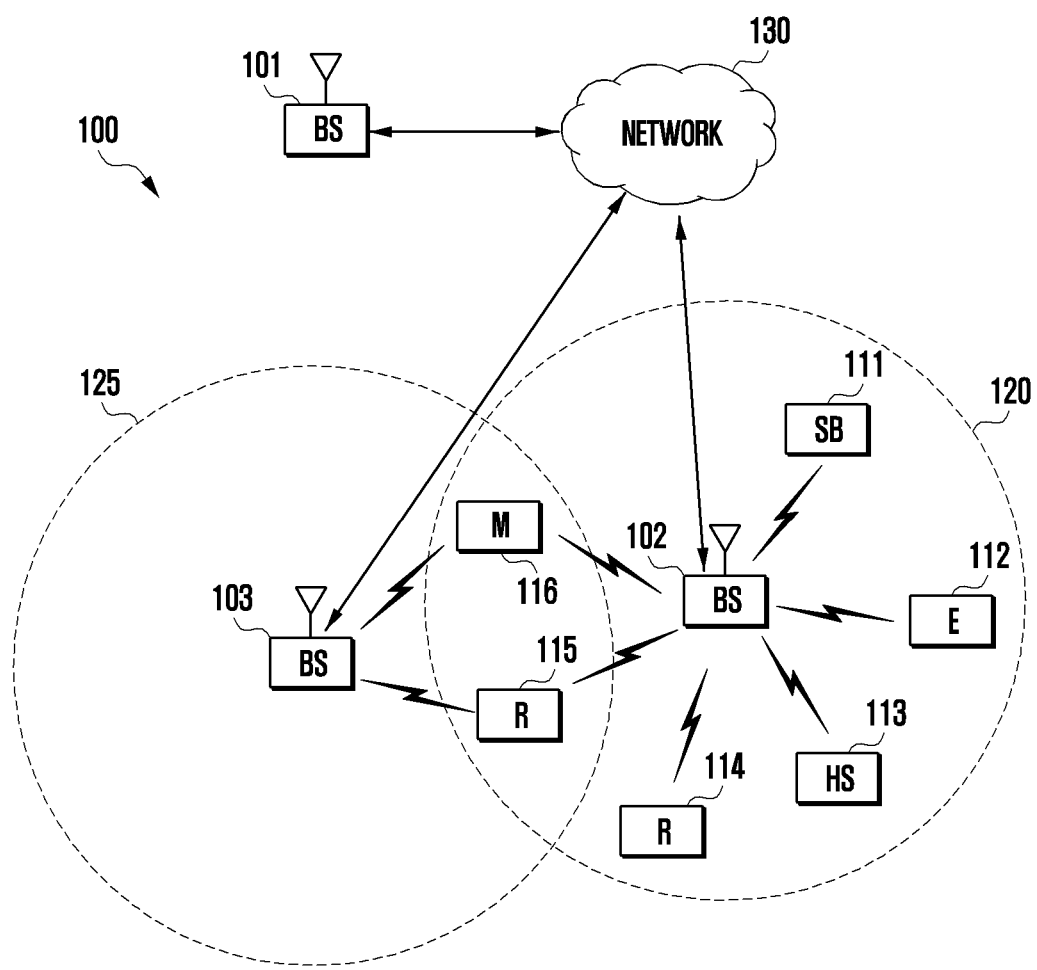
FIG. 1 illustrates an example wireless network according to an embodiment of the disclosure.

FIG. 1 illustrates an example wireless network 100 according to various embodiments of the disclosure. The embodiment of the wireless network 100 shown in FIG. 1 is for illustration only. Other embodiments of the wireless network 100 can be used without departing from the scope of the disclosure.

The wireless network 100 includes a gNodeB (gNB) 101, a gNB 102, and a gNB 103. gNB 101 communicates with gNB 102 and gNB 103. gNB 101 also communicates with at least one Internet Protocol (IP) network 130, such as the Internet, a private IP network, or other data networks.

Depending on a type of the network, other well-known terms such as "base station" or "access point" can be used instead of "gNodeB" or "gNB". For convenience, the terms "gNodeB" and "gNB" are used in this patent document to refer to network infrastructure components that provide wireless access for remote terminals. And, depending on the type of the network, other well-known terms such as "mobile station", "user station", "remote terminal", "wireless terminal" or "user apparatus" can be used instead of "user equipment" or "UE". For convenience, the terms "user equipment" and "UE" are used in this patent document to refer to remote wireless devices that wirelessly access the gNB, no matter whether the UE is a mobile device (such as a mobile phone or a smart phone) or a fixed device (such as a desktop computer or a vending machine).

gNB 102 provides wireless broadband access to the network 130 for a first plurality of user equipments (UEs) within a coverage area 120 of gNB 102. The first plurality of UEs include a UE 111, which may be located in a Small Business (SB); a UE 112, which may be located in an enterprise (E); a UE 113, which may be located in a WiFi Hotspot (HS); a UE 114, which may be located in a first residence (R); a UE 115, which may be located in a second residence (R); a UE 116, which may be a mobile device (M), such as a cellular phone, a wireless laptop computer, a wireless PDA, etc. gNB 103 provides wireless broadband access to network 130 for a second plurality of UEs within a coverage area 125 of gNB 103. The second plurality of UEs include a UE 115 and a UE 116. In some embodiments, one or more of gNBs 101-103 can communicate with each other and with UEs 111-116 using 6G, 5G, Long Term Evolution (LTE), LTE-A, WiMAX or other advanced wireless communication technologies.

The dashed lines illustrate approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more of gNB 101, gNB 102, and gNB 103 include a 2D antenna array as described in embodiments of the disclosure. In some embodiments, one or more of gNB 101, gNB 102, and gNB 103 support codebook designs and structures for systems with 2D antenna arrays.

Although FIG. 1 illustrates an example of the wireless network 100, various changes can be made to FIG. 1. The wireless network 100 can include any number of gNBs and any number of UEs in any suitable arrangement, for example. Furthermore, gNB 101 can directly communicate with any number of UEs and provide wireless broadband access to the network 130 for those UEs. Similarly, each gNB 102-103 can directly communicate with the network 130 and provide direct wireless broadband access to the network 130 for the UEs. In addition, gNB 101, 102 and/or 103 can provide access to other or additional external networks, such as external telephone networks or other types of data networks.

Figure 2A:
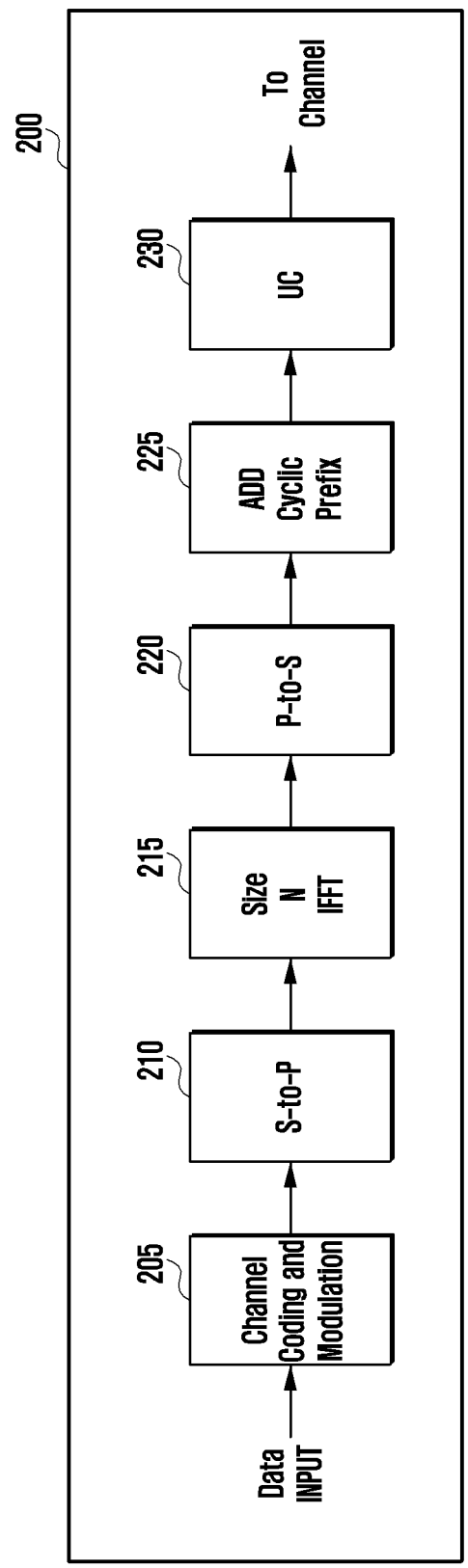
FIG. 2A illustrates an example wireless transmission path according to an embodiment of the disclosure.
Figure 2B:
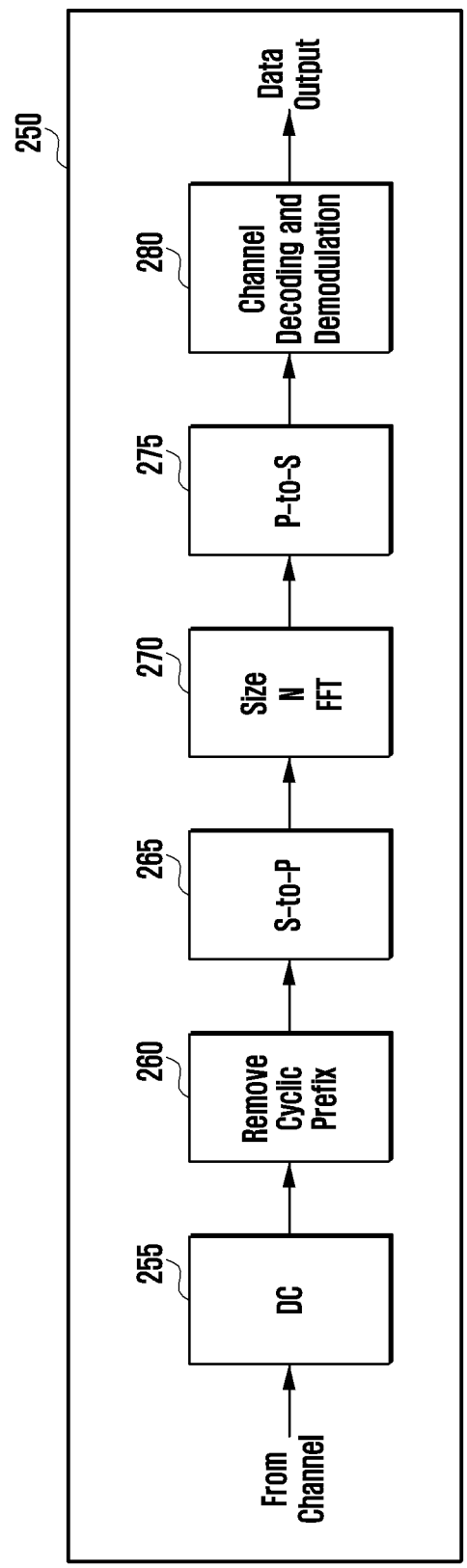
FIG. 2B illustrates an example wireless reception path according to an embodiment of the disclosure.

FIGS. 2A and 2B illustrate example wireless transmission and reception paths according to the disclosure. In the following description, the transmission path 200 can be described as being implemented in a gNB, such as gNB 102, and the reception path 250 can be described as being implemented in a UE, such as UE 116. However, it should be understood that the reception path 250 can be implemented in a gNB and the transmission path 200 can be implemented in a UE. In some embodiments, the reception path 250 is configured to support codebook designs and structures for systems with 2D antenna arrays as described in embodiments of the disclosure.

The transmission path 200 includes a channel coding and modulation block 205, a Serial-to-Parallel (S-to-P) block 210, a size N Inverse Fast Fourier Transform (IFFT) block 215, a Parallel-to-Serial (P-to-S) block 220, a cyclic prefix addition block 225, and an up-converter (UC) 230. The reception path 250 includes a down-converter (DC) 255, a cyclic prefix removal block 260, a Serial-to-Parallel (S-to-P) block 265, a size N Fast Fourier Transform (FFT) block 270, a Parallel-to-Serial (P-to-S) block 275, and a channel decoding and demodulation block 280.

In the transmission path 200, the channel coding and modulation block 205 receives a set of information bits, applies coding (such as Low Density Parity Check (LDPC) coding), and modulates the input bits (such as using Quadrature Phase Shift Keying (QPSK) or Quadrature Amplitude Modulation (QAM)) to generate a sequence of frequency-domain modulated symbols. The Serial-to-Parallel (S-to-P) block 210 converts (such as demultiplexes) serial modulated symbols into parallel data to generate N parallel symbol streams, where N is a size of the IFFT/FFT used in gNB 102 and UE 116. The size N IFFT block 215 performs IFFT operations on the N parallel symbol streams to generate a time domain output signal. The Parallel-to-Serial block 220 converts (such as multiplexes) parallel time domain output symbols from the Size N IFFT block 215 to generate a serial time domain signal. The cyclic prefix addition block 225 inserts a cyclic prefix into the time domain signal. The up-converter 230 modulates (such as up-converts) the output of the cyclic prefix addition block 225 to an RF frequency for transmission via a wireless channel. The signal can also be filtered at a baseband before conversion to the RF frequency.

The RF signal transmitted from gNB 102 arrives at UE 116 after passing through the wireless channel, and operations in reverse to those at gNB 102 are performed at UE 116. The down-converter 255 down-converts the received signal to a baseband frequency, and the cyclic prefix removal block 260 removes the cyclic prefix to generate a serial time domain baseband signal. The Serial-to-Parallel block 265 converts the time domain baseband signal into a parallel time domain signal. The Size N FFT block 270 performs an FFT algorithm to generate N parallel frequency-domain signals. The Parallel-to-Serial block 275 converts the parallel frequency-domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting to UEs 111-116 in the downlink, and may implement a reception path 250 similar to that for receiving from UEs 111-116 in the uplink. Similarly, each of UEs 111-116 may implement a transmission path 200 for transmitting to gNBs 101-103 in the uplink, and may implement a reception path 250 for receiving from gNBs 101-103 in the downlink.

Each of the components in FIGS. 2A and 2B can be implemented using only hardware, or using a combination of hardware and software/firmware. As a specific example, at least some of the components in FIGS. 2A and 2B may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the disclosure. Other types of transforms can be used, such as Discrete Fourier transform (DFT) and Inverse Discrete Fourier Transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2A and 2B illustrate examples of wireless transmission and reception paths, various changes may be made to FIGS. 2A and 2B. For example, various components in FIGS. 2A and 2B can be combined, further subdivided or omitted, and additional components can be added according to specific requirements. Furthermore, FIGS. 2A and 2B are intended to illustrate examples of types of transmission and reception paths that can be used in a wireless network. Any other suitable architecture can be used to support wireless communication in a wireless network.

Figure 3A:
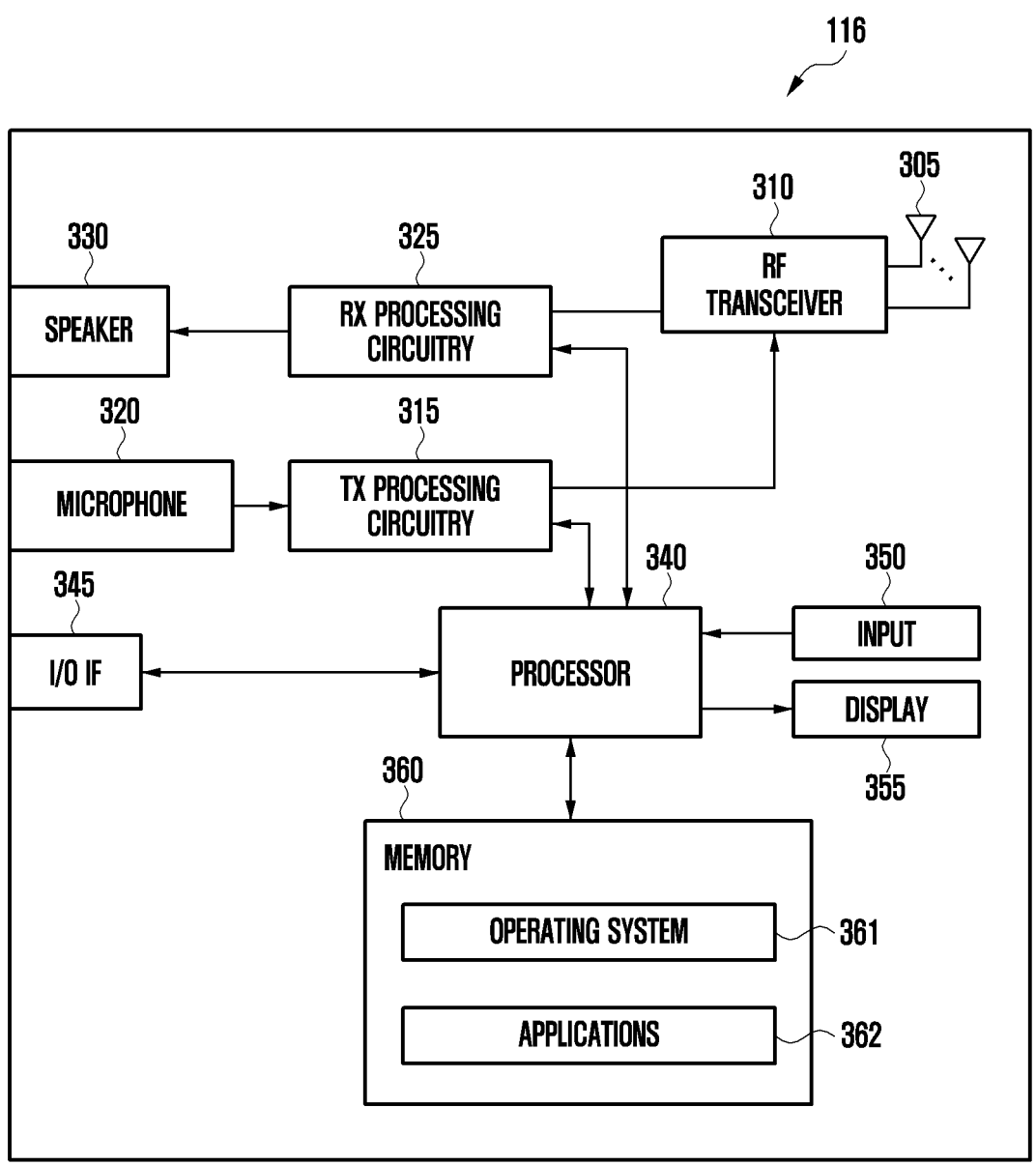
FIG. 3A illustrates an example user equipment (UE) according to the disclosure.

FIG. 3A illustrates an example UE 116 according to the disclosure. The embodiment of UE 116 shown in FIG. 3A is for illustration only, and UEs 111-115 of FIG. 1 can have the same or similar configuration. However, a UE has various configurations, and FIG. 3A does not limit the scope of the disclosure to any specific implementation of the UE.

UE 116 includes an antenna 305, a radio frequency (RF) transceiver 310, a transmission (TX) processing circuitry 315, a microphone 320, and a reception (RX) processing circuitry 325. UE 116 also includes a speaker 330, a processor/controller 340, an input/output (I/O) interface 345, an input device(s) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuitry 325, where the RX processing circuitry 325 generates a processed baseband signal by filtering, decoding and/or digitizing the baseband or IF signal. The RX processing circuitry 325 transmits the processed baseband signal to speaker 330 (such as for voice data) or to processor/controller 340 for further processing (such as for web browsing data).

The TX processing circuitry 315 receives analog or digital voice data from microphone 320 or other outgoing baseband data (such as network data, email or interactive video game data) from processor/controller 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal into an RF signal transmitted via the antenna 305.

The processor/controller 340 can include one or more processors or other processing devices and execute an OS 361 stored in the memory 360 in order to control the overall operation of UE 116. For example, the processor/controller 340 can control the reception of forward channel signals and the transmission of backward channel signals through the RF transceiver 310, the RX processing circuitry 325 and the TX processing circuit 315 according to well-known principles. In some embodiments, the processor/controller 340 includes at least one microprocessor or microcontroller.

The processor/controller 340 is also capable of executing other processes and programs residing in the memory 360, such as operations for channel quality measurement and reporting for systems with 2D antenna arrays as described in embodiments of the disclosure. The processor/controller 340 can move data into or out of the memory 360 as required by an execution process. In some embodiments, the processor/controller 340 is configured to execute the application 362 based on the OS 361 or in response to signals received from the gNB or the operator. The processor/controller 340 is also coupled to an I/O interface 345, where the I/O interface 345 provides UE 116 with the ability to connect to other devices such as laptop computers and handheld computers. I/O interface 345 is a communication path between these accessories and the processor/controller 340.

The processor/controller 340 is also coupled to the input device(s) 350 and the display 355. An operator of UE 116 can input data into UE 116 using the input device(s) 350. The display 355 may be a liquid crystal display or other display capable of presenting text and/or at least limited graphics (such as from a website). The memory 360 is coupled to the processor/controller 340. A part of the memory 360 can include a random access memory (RAM), while another part of the memory 360 can include a flash memory or other read-only memory (ROM).

Although FIG. 3A illustrates an example of UE 116, various changes can be made to FIG. 3A. For example, various components in FIG. 3a can be combined, further subdivided or omitted, and additional components can be added according to specific requirements. As a specific example, the processor/controller 340 can be divided into a plurality of processors, such as one or more central processing units (CPUs) and one or more graphics processing units (GPUs). Furthermore, although FIG. 3A illustrates that the UE 116 is configured as a mobile phone or a smart phone, UEs can be configured to operate as other types of mobile or fixed devices.

Figure 3B:
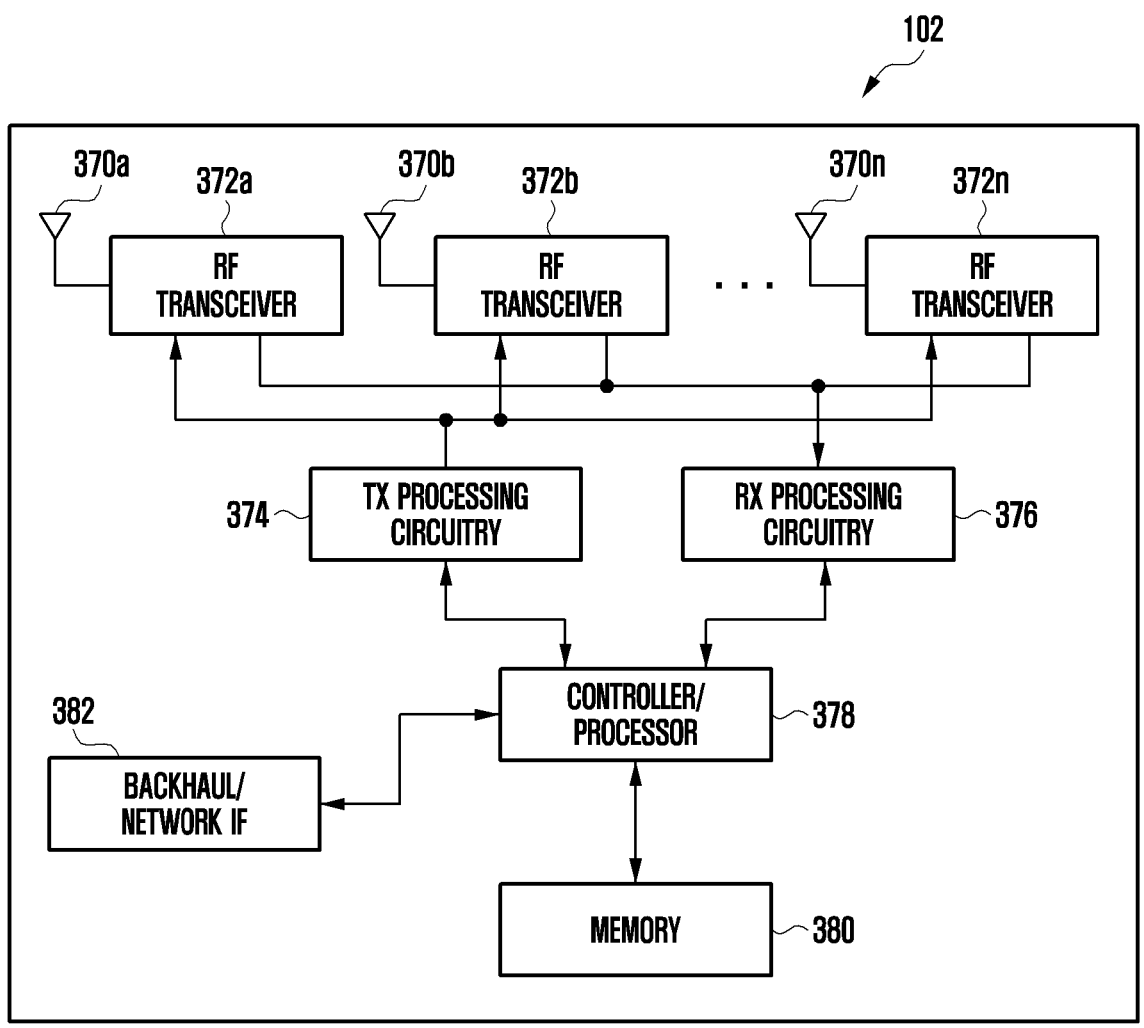
FIG. 3B illustrates an example gNB according to the disclosure according to an embodiment of the disclosure.

FIG. 3B illustrates an example gNB 102 according to the disclosure. The embodiment of gNB 102 shown in FIG. 3B is for illustration only, and other gNBs of FIG. 1 can have the same or similar configuration. However, a gNB has various configurations, and FIG. 3b does not limit the scope of the disclosure to any specific implementation of a gNB. It should be noted that gNB 101 and gNB 103 can include the same or similar structures as gNB 102.

As shown in FIG. 3B, gNB 102 includes a plurality of antennas 370a-370n, a plurality of RF transceivers 372a-372n, a transmission (TX) processing circuitry 374, and a reception (RX) processing circuitry 376. In certain embodiments, one or more of the plurality of antennas 370a-370n include a 2D antenna array. gNB 102 also includes a controller/processor 378, a memory 380, and a backhaul or network interface 382.

RF transceivers 372a-372n receive an incoming RF signal from antennas 370a-370n, such as a signal transmitted by UEs or other gNBs. RF transceivers 372a-372n down-convert the incoming RF signal to generate an IF or baseband signal. The IF or baseband signal is transmitted to the RX processing circuitry 376, where the RX processing circuitry 376 generates a processed baseband signal by filtering, decoding and/or digitizing the baseband or IF signal. RX processing circuitry 376 transmits the processed baseband signal to controller/processor 378 for further processing.

The TX processing circuitry 374 receives analog or digital data (such as voice data, network data, email or interactive video game data) from the controller/processor 378. TX processing circuitry 374 encodes, multiplexes and/or digitizes outgoing baseband data to generate a processed baseband or IF signal. RF transceivers 372a-372n receive the outgoing processed baseband or IF signal from TX processing circuitry 374 and up-convert the baseband or IF signal into an RF signal transmitted via antennas 370a-370n.

The controller/processor 378 can include one or more processors or other processing devices that control the overall operation of gNB 102. For example, the controller/processor 378 can control the reception of forward channel signals and the transmission of backward channel signals through the RF transceivers 372a-372n, the RX processing circuitry 376 and the TX processing circuitry 374 according to well-known principles. The controller/processor 378 can also support additional functions, such as higher-level wireless communication functions. For example, the controller/processor 378 can perform a Blind Interference Sensing (BIS) process such as that performed through a BIS algorithm, and decode a received signal from which an interference signal is subtracted. A controller/processor 378 may support any of a variety of other functions in gNB 102. In some embodiments, the controller/processor 378 includes at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays as described in embodiments of the disclosure. In some embodiments, the controller/processor 378 supports communication between entities such as web RTCs. The controller/processor 378 can move data into or out of the memory 380 as required by an execution process.

The controller/processor 378 is also coupled to the backhaul or network interface 382. The backhaul or network interface 382 allows gNB 102 to communicate with other devices or systems through a backhaul connection or through a network. The backhaul or network interface 382 can support communication over any suitable wired or wireless connection(s). For example, when gNB 102 is implemented as a part of a cellular communication system, such as a cellular communication system supporting 6G or 5G or new radio access technology or NR, LTE or LTE-A, the backhaul or network interface 382 can allow gNB 102 to communicate with other gNBs through wired or wireless backhaul connections. When gNB 102 is implemented as an access point, the backhaul or network interface 382 can allow gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the controller/processor 378. A part of the memory 380 can include an RAM, while another part of the memory 380 can include a flash memory or other ROMs. In certain embodiments, a plurality of indications, such as the BIS algorithm, are stored in the memory. The plurality of indications are configured to cause the controller/processor 378 to execute the BIS process and decode the received signal after subtracting at least one interference signal determined by the BIS algorithm.

As will be described in more detail below, the transmission and reception paths of gNB 102 (implemented using RF transceivers 372a-372n, TX processing circuitry 374 and/or RX processing circuitry 376) support aggregated communication with FDD cells and TDD cells.

Although FIG. 3B illustrates an example of gNB 102, various changes may be made to FIG. 3B. For example, gNB 102 can include any number of each component shown in FIG. 3A. As a specific example, the access point can include many backhaul or network interfaces 382, and the controller/processor 378 can support routing functions to route data between different network addresses. As another specific example, although shown as including a single instance of the TX processing circuitry 374 and a single instance of the RX processing circuitry 376, gNB 102 can include multiple instances of each (such as one for each RF transceiver).

Exemplary embodiments of the disclosure are further described below with reference to the accompanying drawings. The following methods and apparatuses of the disclosure can be implemented in a communication system supporting 6G or 5G or new radio access technologies or NR, LTE or LTE-A, etc.

Figure 4:
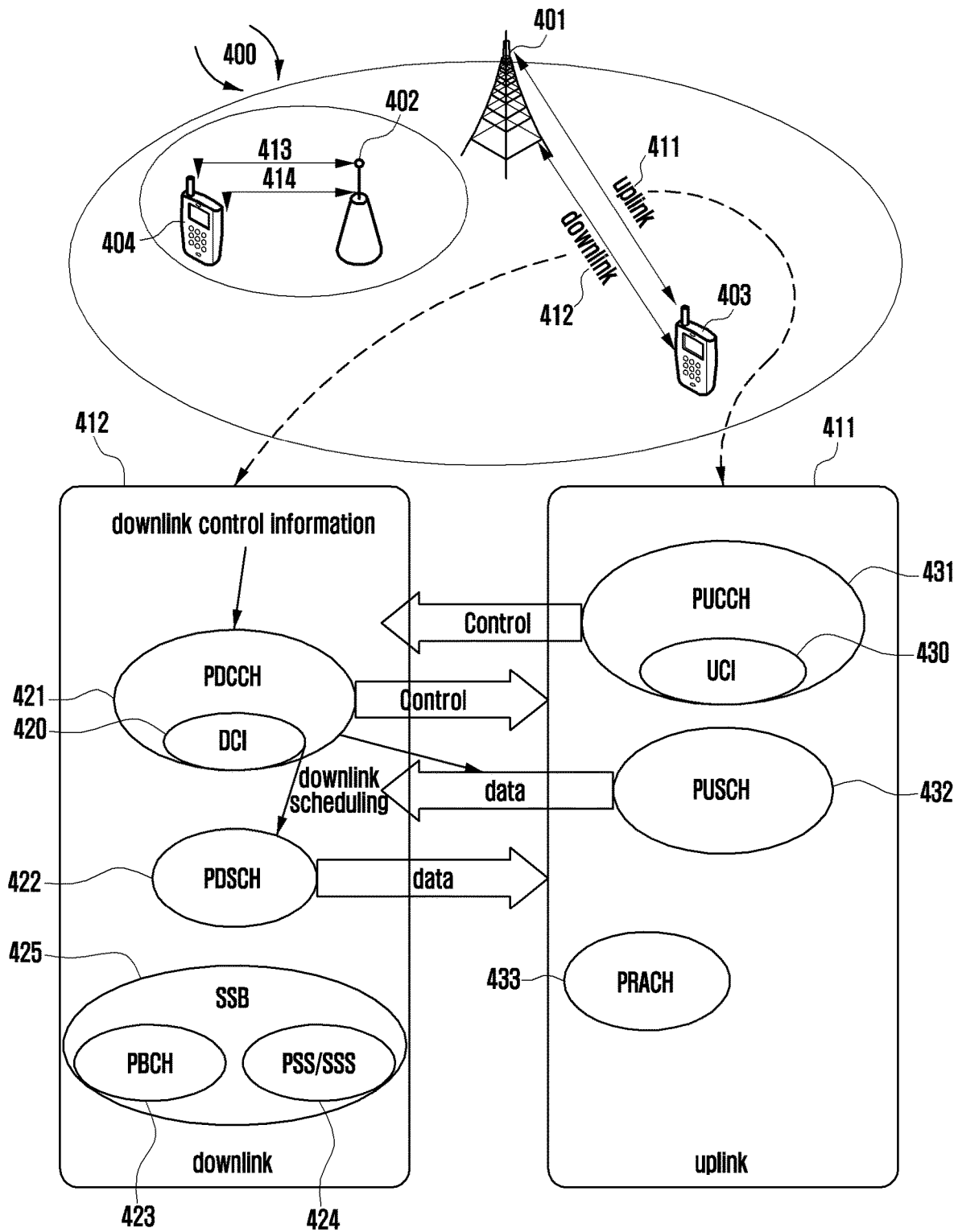
FIG. 4 illustrates different physical channels of an example of downlink and uplink according to an embodiment of the disclosure.

FIG. 4 illustrates an example of a wireless communication system 400 according to an embodiment of the present application, wherein the wireless communication system 400 includes one or more fixed infrastructure units, forming a network distributed in a geographical area. Infrastructure units may include an AP (Access Point), AT (Access Terminal), BS (base station), Node-B (node B), eNB (evolved NodeB) and gNB (next generation base station), etc., or other terms used in the art.

As shown in FIG. 4, the infrastructure units 401 and 402 provide services for several MSs (mobile stations) or UEs or terminal devices or users 403 and 404 in the service area, and the service area is within the range of the cell or cell sector. In some systems, one or more BSs can be communicably coupled to a controller forming an access network, which can be communicatively coupled to one or more core networks. This example is not limited to any particular wireless communication system.

In the time domain and/or frequency domain, the infrastructure units 401 and 402 transmit DL (Downlink) communication signals 412 and 413 to MSs or UEs 403 and 404, respectively. MSs or UEs 403 and 404 communicate with infrastructure units 401 and 402 via UL (Uplink) communication signals 411 and 414, respectively.

In one embodiment, the mobile communication system 400 is an OFDM (Orthogonal Frequency Division Multiplexing)/OFDMA (Orthonormal Frequency Division Multiple Access) system which includes multiple base stations and multiple UEs, and the multiple base stations include base station 401, base station 402, and the multiple UEs include UE 403 and UE 404. Base station 401 communicates with UE 403 through a UL communication signal 411 and a DL communication signal 412.

When the base station has downlink packets to be transmitted to UEs, each UE will obtain a downlink allocation (resource), such as a set of radio resources in a PDSCH (Physical Downlink Shared Channel). When the UE needs to transmit packets to the base station in the uplink, the UE obtains a grant from the base station, in which the grant assigns a PUSCH (Physical Uplink Shared Channel) containing a set of uplink radio resources. The UE obtains downlink or uplink scheduling information from the PDCCH (Physical Downlink Control Channel) with respect to itself. The downlink or uplink scheduling information and other control information carried by the PDCCH are referred to as DCI (downlink Control Information).

FIG. 4 also illustrates different physical channels of the downlink 412 and uplink 411 examples. The downlink 112 includes a PDCCH 421, a PDSCH 422, a PBCH (Physical Broadcast Channel) 423 and a PSS (Primary Synchronization Signal)/SSS (Secondary Synchronization Signal) 424. In 5G NR, the PSS, SSS and PBCH constitute a SSB (SS/PBCH block) 425 together. The PDCCH 421 transmits DCI 420 to the UE, that is, the DCI 420 is carried by the PDCCH 421. The PDSCH 422 transmits downlink data information to the UE. The PBCH carries a MIB (Master Information Block), which is used for early UE discovery and cell-wide coverage. Uplink 411 includes a PUCCH (Physical Uplink Control Channel) 431 carrying UCI (Uplink Control Information) 430, a PUSCH 432 carrying uplink data information and a PRACH (Physical Random Access Channel) 433 carrying random access information.

In one embodiment, the wireless communication network 400 uses OFDMA or multi-carrier architecture, including AMC (Adaptive Modulation And Coding) on the downlink and the next generation single carrier FDMA architecture or multi carrier OFDMA architecture for UL transmission. The single carrier architecture based on FDMA includes IFDMA (Interleaved FDMA), LFDMA (Localized FDMA), DFT-SOFDM (DFT-spread OFDM) of IFDMA or LFDMA. In addition, it also includes various enhanced NOMA (non-orthogonal multiple access) architectures of OFDMA systems.

OFDM systems serve the far end units by allocating downlink or uplink radio resources that usually contain a set of subcarriers on one or more OFDM symbols. Examples of OFDMA protocols include a series of standards, such as LTE and 5G NR developed in 3GPP UMTS standard, and IEEE 802.16 in IEEE standard, etc. The architecture can also include the use of transmission technologies, such as MC-CDMA (multi-carrier CDMA), MC-DS-CDMA (multi-carrier direct sequence CDMA), and OFCDM (Orthogonal Frequency and Code Division Multiplexing (of one-dimensional or two-dimensional transmission)). Alternatively, simpler time and/or frequency division multiplexing/multiple access technologies, or a combination of these different technologies, may be employed. In an optional embodiment, the communication system may use other cellular communication system protocols, including but not limited to TDMA (Time division multiple access) or CDMA (Code Division Multiple Access).

The text and drawings are provided as examples only to help the readers understand the disclosure. They do not intend to limit and should not be interpreted as limiting the scope of this disclosure in any way. Although certain embodiments and examples have been provided, based on the disclosure herein, it will be apparent to those skilled in the art that changes may be made to the illustrated embodiments and examples without departing from the scope of the disclosure.

In some cases, a UE needs to report UE capability to a base station. UE capability can include but is not limited to: duplex mode, uplink and downlink transition time, retuning time, PUSCH additional delay time, PDSCH additional delay time, PUCCH additional delay time, time from PDCCH scheduling to PUSCH transmission, time from PDCCH scheduling to PDSCH reception, time from PDSCH reception to ACK/NACK feedback, time from CSI triggering to reporting, time from CSI measuring to reporting, polarization type of UE antennas, number of UE antennas etc. Among them, the ways to support these different UE capabilities include the need to configure some time intervals for the UE between different transmission or reception of uplink and downlink channels, in which these time intervals include but are not limited to: uplink and downlink transition time, retuning time, PUSCH additional delay time, PDSCH additional delay time, PUCCH additional delay time, time from PDCCH scheduling to PUSCH transmission, time from PDCCH scheduling to PDSCH reception, time from PDSCH reception to ACK/NACK feedback, time from CSI triggering to reporting, time from CSI measuring to reporting. Specifically, for example, to meet the UE capability of time from PDCCH scheduling to PUSCH transmission, the base station can achieve this by configuring the time from PDCCH scheduling to PUSCH transmission, or by configuring the time from PDCCH scheduling to PUSCH transmission and PUSCH additional delay time.

Some of the above UE capabilities are briefly described below.

Duplex Mode:

The UE can adopt full duplex, half duplex and simplex mode. In addition, the UE can adopt modes such as time division duplex (TDD), frequency division duplex (FDD), half frequency division duplex (HD-FDD), etc. Those skilled in the art are familiar with the above duplex mode and will not repeat it in this paper.

Uplink and Downlink Transition Time:

The uplink and downlink transition time of UE is described according to different duplex modes of UE.

Uplink and Downlink Switching Time of UE Adopting TDD:

In the NR system, TDD will be configured with configurations of uplink and downlink directions. That is, through RRC, a direction of a slot or symbol can be configured as a downlink, uplink or flexible symbol or slot for a UE. The UE can calculate the location of sub-frames and symbols which can be flexibly configured in the middle part through the configured DL-UL-Transmission-Periodicity. In addition, the base station can further indicate or modify dynamically through a slot format indicator (SFI). The priority of the SFI is higher than that of semi-persistent configuration, such as measurement, CSI (Channel status information) feedback, SRS (sounding reference signal) transmission, and semi-persistent scheduling (SPS) uplink (also known as grant free uplink transmission, or configured grant based uplink transmission, or semi persistent scheduling) or SPS downlink transmission. That is, when the UE obtains the SPS uplink (or downlink) configuration through the RRC, the UE can transmit the uplink signal (or receive the downlink signal) on semi-persistently configured uplink (or downlink) slots or symbols with the same uplink and downlink transmission directions. Similarly, for the uplink (or downlink) SPS activated by the DCI, the resource indicated by the first activated DCI can be regarded as the resource dynamically scheduled by the DCI, while the subsequent SPS resources are regarded as the measurement, that is, with a lower priority than the SFI priority. The priority of the resource dynamically scheduled by the DCI is higher than that rewritten by the SFI (but none of them can conflict with the uplink and downlink directions of RRC semi-persistent configuration).

In NR TDD systems, the base station periodically indicates the uplink and downlink attributes of slots and symbols to UE, for example, the periodic slot configuration is indicated by the high-level signaling, or the slot format over a period of time is indicated by the dynamic signaling (such as the DCI). The uplink and downlink attributes of each frequency domain resource in each slot/symbol is determined through slot configuration/format: for uplink transmission, for downlink transmission, or for flexible transmission. Flexible slot/symbol may be used as both uplink and downlink transmission, but can only be the transmission in one direction at a certain time. For the periodic slot configuration configured through high-level signaling, the cell common UL/DL information or UE specific UL/DL information can be configured. In addition, since the uplink and downlink properties of all frequency-domain resources in one slot/symbol are the same, in order to avoid interference with important signals, signals with uplink and downlink attributes opposite to those of these signals cannot be transmitted or received in the symbols containing these signals. For example, the UE cannot transmit PUSH/PUCCH/PRACH/SRS on the symbol where the synchronization/broadcast channel block SS/PBCH block is located. For another example, the UE will not receive other downlink signals in a symbol containing the PRACH resource indicated by RACH-ConfigCommon.

In NR, in order to deal with uplink timing advance (TA) and switching from downlink to uplink, switching time for TDD system is defined in a protocol. For the UE that does not support full duplex communication, in the scenario of dual connectivity (DC) or carrier aggregation (CA) or supplementary uplink (SUL), the UE does not need to perform uplink transmission at the time that is earlier than $N_{Rx-Tx}T_c$ in any cell after the last downlink symbol; and does not need to perform downlink reception at the time that is earlier than $N_{Tx-Rx}T_c$ in any cell after transmitting the last uplink transmission symbol. $N_{Rx-Tx}T_c$ and $N_{Tx-Rx}T_c$ are defined in Table 1. $T_c=1/(\Delta f_{max} \cdot N_f)$ is time unit, wherein, $\Delta f_{max}=480 \cdot 10^3$ Hz and $N_f=4096$. For a TDD system, the UE decides to receive or transmit a channel on a symbol according to uplink and downlink attributes indicated by the base station, dynamic scheduling and predefined rules. Meanwhile, the base station needs to ensure the UE's uplink and downlink transition time through scheduling. Frequency range 1 (FR1) and frequency range 2 (FR2) respectively represent frequency range 1 (low frequency, such as <6 GHz) and frequency range 2 (high frequency, such as >6 GHz).

TABLE 1

Uplink and downlink transition time $N_{Rx-Tx}$ and $N_{Tx-Rx}$

| Uplink and downlink transition time | FR1 | FR2 |
|---|---|---|
| $N_{Tx-Rx}$ | 25600 | 13792 |
| $N_{Rx-Tx}$ | 25600 | 13792 |

Uplink and downlink transition time of UE adopting HD-FDD:

For a half duplex HD-FDD UE, if uplink and downlink share the same crystal oscillator, the UE will need a long time to retune due to different frequencies that the uplink and downlink are at. For example, for half duplex FD-FDD MTC (machine type communication) in an LTE system, users need one slot (1 millisecond) to retune. For a UE with an unshared crystal oscillator, it takes the time of 1-2 symbols to retune. For general full duplex FD-FDD UE, because the UE can transmit and receive on different frequencies at the same time, the base station does not need to configure uplink and downlink slots/symbols for it. However, for HD-FDD UE, at the same time, the UE can only transmit or receive, but cannot simultaneously transmit and receive.

In LTE, a guard period (or guard interval) of N symbols is defined between transmission and reception for MTC UE of HD-FDD.

In order to reduce the complexity or cost of the UE, NR will consider the support for HD-FDD UE. Considering the uplink and downlink shared oscillator and the uplink and downlink unshared oscillator, half duplex FDD can be divided into two types: Type A HD-FDD and Type B HD-FDD. Among them, Type A HD-FDD has two oscillators, so the switching between uplink and downlink can be completed in a very short time (such as the first interval). However, Type B HD-FDD has only one oscillator. Due to the different uplink and downlink frequencies of an FDD system, a long time interval (such as the second interval) is needed for switching between uplink and downlink. For Type A HD-FDD UE, since there are two oscillators, table 1 may possibly be used for Type A HD-FDD UE. In addition, due to different uplink and downlink frequency points of FDD, it may take a little longer time after uplink and downlink converts to each other. Then a new uplink and downlink transition time table can be defined additionally. Similarly, for HD-FDD UE of type B, it is necessary to define another uplink and downlink transition time table with longer uplink and downlink transition time. Among them, the uplink and downlink transition time in the above two new uplink and downlink transition time tables may have the same or different values for different frequency domain ranges.

PUSCH additional delay time, PDSCH additional delay time, PUCCH additional delay time:

In communication systems such as but not limited to NR, a PUSCH resource allocation table and a PDSCH resource allocation table can be defined in advance in protocol before receiving the RRC configuration. Since before obtaining the PUSCH scheduled by the time domain resource scheduling indication (such as the time domain resource scheduling indication transmitted through RAR, UE specific RRC message, etc. described below) transmitted from the base station, the PDSCH carrying the time domain resource scheduling indication needs to be decoded first, the decoding process takes a longer time. Therefore, the communication system can define an additional subcarrier spacing specific slot level delay value (hereinafter referred to as "PUSCH additional delay time") for the PUSCH scheduled by the time domain resource scheduling indication, as shown in Table 2.

Similarly, additional delay for the PDSCH can be introduced to support the UE with features such as needing longer PDCCH decoding time, or storage space being limited or needing power saving, etc. In this way, after receiving the PDCCH, the UE does not need to cache the possible downlink data scheduled by the PDSCH in advance, and sleeps in the additional delay scheduling process, so as to save storage space and/or power.

Similarly, in order to reduce the complexity and energy consumption of the UE, more time can be given for the PDSCH to be decoded. Similarly, it can be achieved by introducing scheduling of additional delay from the PDSCH to the PUCCH. It will not be repeatedly described here.

TABLE 2

PUSCH additional delay time $\Delta$

| Subcarrier spacing $\mu_{PUSCH}$ | $\Delta$ |
|---|---|
| 0 | 2 |
| 1 | 3 |
| 2 | 4 |
| 3 | 6 |

Time from PDCCH scheduling to PUSCH transmission:

Next, the PUSCH time domain resource scheduling table is described with reference to table 3, and the elements in the table indicate at least the time from PDCCH scheduling to PUSCH transmission, specifically, the time interval between PDCCH decoding success and PUSCH transmission start.

In the NR system, the base station configures the resource set for PUSCH time domain resource allocation (TDRA) through the RRC, and then dynamically indicates one resource of the resource set through the DCI. In a communication system such as but not limited to the Rel-15 NR system, each item in the set of TDRA configured by high-level signaling may include: slot deviation K2 (used to determine the start slot of PUSCH transmission), mapping type (Type A and Type B mapped by DMRS), the start and length indicator (SLIV) used to indicate the start symbol S and length L (joint coding), or directly indicated start symbol S and length L, and demodulation reference signal (DMRS) position (dmrs-Type-A-Positon in NR protocol).

The physical uplink shared channel (PUSCH) is taken as an example to illustrate, and the same method is applicable to the physical downlink shared channel PDSCH.

```
PUSCH-TimeDomainResourceAllocation ::=  SEQUENCE {
  k2  INTEGER(0..32)  OPTIONAL, -- Need S
  mappingType  ENUMERATED {typeA, typeB},
  startSymbolAndLength  INTEGER (0..127)
}
```

The slot of the PUSCH transmitted by the UE is determined as $$\left\lfloor n \cdot \frac{2^{\mu_{PUSCH}}}{2^{\mu_{PDCCH}}} \right\rfloor + K_2$$

through K2.

n is the slot where the scheduling DCI is, K2 is determined based on the numerology of the PUSCH, and gUSCH and gDCCH are subcarrier spacings of the PUSCH and PDCCH respectively, and The start symbol S allocated to the PUSCH relative to the start slot and the number L of consecutive symbols calculated from the symbol S are determined by the following methods and according to the start and length indication (SLIV) corresponding to the row of the index:

if $(L-1) \leq 7$, $SLIV=14 \cdot (L-1)+S$
else $SLIV=14 \cdot (14-L+1)+(14-1-S)$,
wherein $0 < L \leq 14-S$, and According to the mapping type corresponding to the row of the index, the mapping type of the PUSCH is set based on the PUSCH mapping type of type A and type B defined in section 6.4.1.1.3 of TS 38.211. Where j is the predefined value corresponding to the subcarrier spacing.

TABLE 3

PUSCH time domain resource scheduling table

| Index | PUSCH mapping type | PUSCH time domain resource scheduling table | | |
|---|---|---|---|---|
| | | K2 | S | L |
| 1 | Type A | j | 0 | 2 |
| 2 | Type A | j | 0 | 7 |
| 3 | Type A | j | 2 | 8 |
| 4 | Type B | j | 1 | 8 |
| 5 | Type B | j | 8 | 6 |
| 6 | Type B | j | 10 | 4 |
| 7 | Type B | j | 4 | 6 |
| 8 | Type A | j + i | 0 | 14 |
| 9 | Type A | j + i | 0 | 12 |
| 10 | Type A | j + i | 0 | 10 |
| 11 | Type A | j + 2 | 0 | 14 |
| 12 | Type A | j + 2 | 0 | 12 |
| 13 | Type A | j + 2 | 0 | 10 |
| 14 | Type B | j | 8 | 6 |
| 15 | Type A | j + 3 | 0 | 14 |
| 16 | Type A | j + 3 | 0 | 10 |

The time from PDCCH scheduling to PDSCH reception may be indicated by the PDSCH time domain resource scheduling table, of which the structure may be similar to the above PUSCH time domain resource scheduling table, which will not be repeatedly described here.

Retuning Time:

The time interval required for uplink and downlink tuning of HD-FDD UE mentioned in the above description of uplink and downlink transition time is also applicable when a narrowband UE is scheduled in a broadband system. In LTE, when the UE is retuning from one narrowband to another, the UE may create a protection period in the first n symbols of the second narrowband. However, the location and method for the UE to create the protection period are not limited to this.

As mentioned above, if the base station turns on frequency domain retuning, it may be necessary to reserve a certain time interval X for the UE for RF retuning. Different UEs may need different time intervals X: for example, some UEs do not need time interval X; some UEs need time interval X which is smaller or equal to (equal to or slightly greater than) the cyclic prefix (CP), so there is no need to additionally introduce a time interval X; some UEs need one or more symbols as time interval X; some UEs need one or more slots as time interval X, etc. The time interval X may also be an absolute time.

Figure 6A:
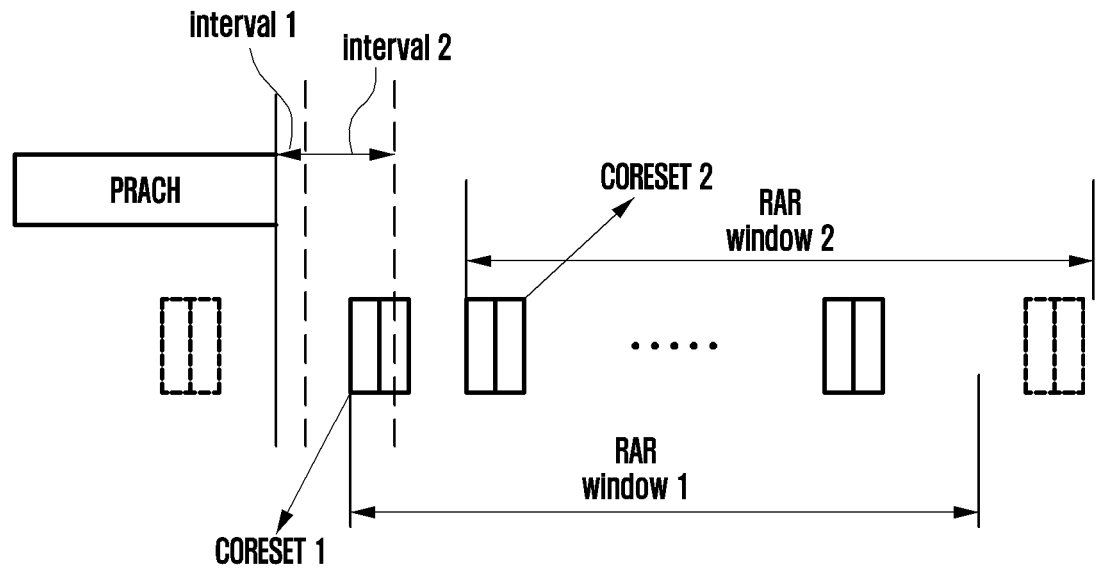
FIG. 6A illustrates PRACH transmission to RAR window reception according to an embodiment of the disclosure.

For a UE with limited capability (for example, a UE whose RF bandwidth is less than the bandwidth part (BWP) bandwidth), if the base station turns on frequency domain retuning, it is necessary to reserve a certain time interval X for the UE for RF retuning. For the same PUSCH/PUCCH transmission or PDSCH/PDCCH reception that is not within the RF bandwidth of the UE, a time interval X needs to be introduced between two hops. As shown in FIG. 6C, taking the PUSCH as an example, if the frequency retuning position of the two PUSCH transmission blocks exceeds the RF bandwidth of the UE, a certain time interval X needs to be reserved for the UE for retuning. The UE reports to the base station whether the time interval X is needed and how large the time interval X is. In addition, since different time intervals X may be required according to different frequency domain retuning span, the UE may report the retuning processing capability of the UE in different cases. For example, as shown in Table 4, for the sake of simplicity, some combinations of UE's retuning processing capabilities may be defined in advance, such as retuning processing capability A (for example, the UE that needs less processing time), retuning processing capability B (for example, the UE that needs more processing time), and the corresponding time interval values of each retuning processing capability under different conditions. For example, in condition 1 (when the tuning frequency interval is greater than 1 GHz frequency domain), the value of UE retuning processing capability A is time interval 1-A, and the value of UE retuning processing capability B is time interval 1-B, etc. Among them, different conditions may include: different frequency intervals, frequency intervals between uplink transmission, frequency intervals between downlink reception, frequency intervals between uplink transmission and downlink reception, frequency intervals between downlink reception and uplink transmission, etc.

In one example, the different conditions may be different subcarrier spacings. For example, UE retuning processing capability A requires an interval 1-A of one symbol and an interval 2-A of four symbols at 15 kHz subcarrier spacing (condition 1) and 60 kHz subcarrier spacing (condition 2). The base station may schedule for the UE according to the subcarrier spacing configured in the current BWP and the capability corresponding to the subcarrier spacing, for example, the base station may directly configure or indicate an appropriate spacing for the UE. Specifically, for example, the base station schedules the PUSCH for the UE with capability A on the BWP with subcarrier spacing of 15 KHz, and indicates an interval frequency hopping interval of two symbols for the UE, where two symbols are larger than the interval 1-A required by the UE, which is one symbol. Then the UE performs the PUSCH transmission according to the scheduling of the base station.

Alternatively, the base station may calculate the interval required by the UE (for example, the interval that the UE will create or insert in a specific transmission) according to the subcarrier spacing configured by the current BWP, the defined rules and the UE's capabilities. Specifically, for example, the base station schedules the PUSCH for the UE with capability A on the BWP with a subcarrier spacing of 15 kHz. According to the predefined rules (for the subcarrier spacing of 15 KHz, an interval of one symbol is created (or inserted) between two frequency hops), the UE creates (or inserts) a one-symbol interval between two frequency hops of PUSCH. Then, the UE performs PUSCH transmission according to the scheduling of the base station and the predefined rules.

In one example, the different conditions may be different frequency domain distances between frequency hops. For example, UE retuning processing capability A requires an interval 1-A of five symbols and an interval 2-A of 14 symbols (one slot) for a frequency interval less than 1 GHz (condition 1) and an interval greater than 1 GHz (condition 2), respectively. Among them, 1 GHz may be replaced by other frequency values. Or the different conditions are whether it is in the same band/carrier, such as whether it is inter-carrier frequency hopping.

TABLE 4

UE retuning time capability table

|  | Condition 1 | Condition 2 |
| --- | --- | --- |
| Capability A | Interval 1-A | Interval 2-A |
| Capability B | Interval 1-B | Interval 2-B |

The above describes UE capabilities by taking duplex mode, uplink and downlink transition time, PUSCH additional delay time, PDSCH additional delay time, PUCCH additional delay time, time from PDCCH scheduling to PUSCH transmission, and retuning time as examples. However, UE capabilities are not limited to these and may also include other time intervals, such as the time from PDCCH scheduling to PDSCH reception, the time from PDSCH reception to ACK/NACK feedback, the time from CSI triggering to reporting, and the time from CSI measuring to reporting.

In addition, UE capabilities may also include the polarization type of UE antennas and the number of UE antennas.

Figure 3C:
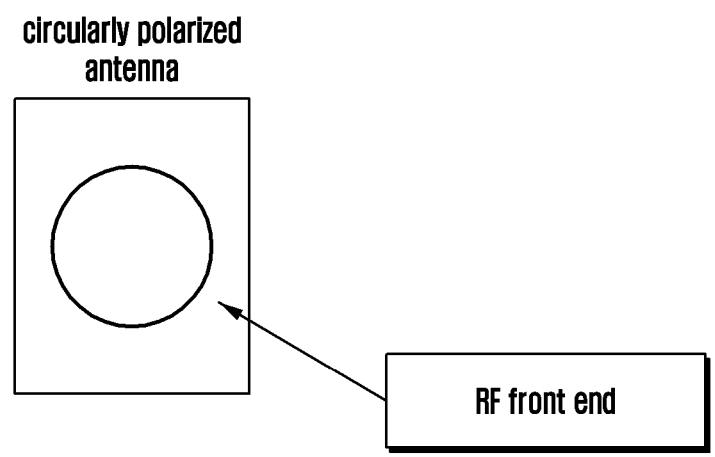
FIG. 3C illustrates a circularly polarized antenna according to an embodiment of the disclosure.
Figure 3D:
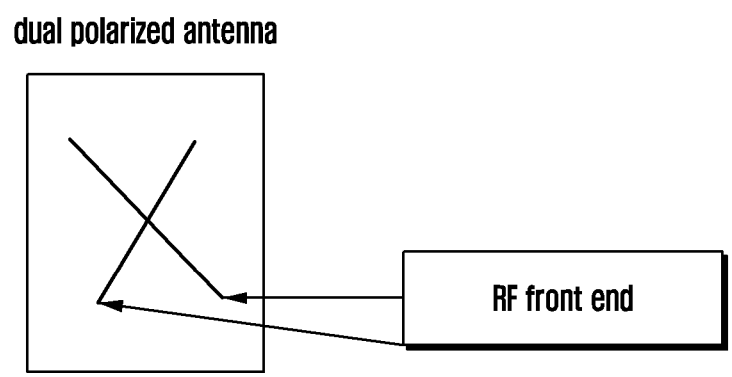
FIG. 3D illustrates a dual polarized antenna according to an embodiment of the disclosure.

For the antennas operating in high frequency (FR2), generally the dual polarization direction may be used to reduce the antenna size. According to the propagation characteristics of an electromagnetic wave, the dual polarization direction may carry different data in different polarization directions to achieve effects such as improving channel capacity or providing diversity gain and the like. In the design of the low-cost UE of NR, the UE may only support one RF front end on FR2. In this case, the UE may have the following antenna implementation schemes:

Scheme 1: The UE may achieve the circularly polarized transmission and/or reception. Specifically, as shown in FIG. 3C, the antenna may be designed as circular polarization directly, or circular polarization may be realized by crossing dual polarization directions (as shown in FIG. 3D). Since the UE has only one RF front end, the RF front end may be connected to both directions of dual polarization at the same time. No matter which way is used for antenna design, the UE will receive or transmit on omni-direction.

Figure 3E:
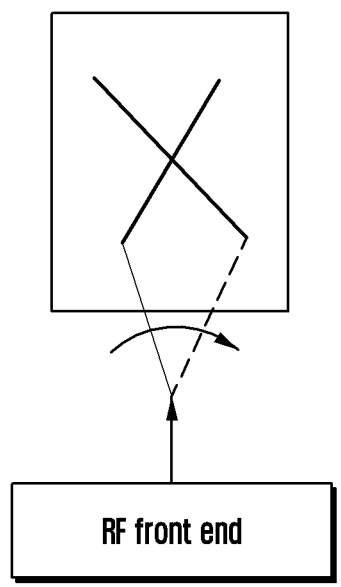
FIG. 3E illustrates switching of a dual polarized antenna according to an embodiment of the disclosure.

Scheme 2: The UE may adopt dual polarization directions, but only one direction is connected to the RF front end at the same time. The UE may transmit or receive in one of the dual polarization directions by switching, as shown in FIG. 3E. This method may realize the matching with the base station as soon as possible by changing the polarization direction.

Scheme 3: The UE only supports one polarization direction. At this time, if the communication between the base station and the UE is to be established, if the polarization direction may be obtained, the transmission energy may be reduced, or the effect of improving channel capacity may be achieved by user matching.

In order to establish a connection between the base station and the UE for communication, for the circular polarization direction, then it may be considered as an omni-directional antenna, and the base station may transmit either polarization direction of circular polarization or dual polarization for the UE. If the UE is in single polarization direction, the UE may also communicate with the base station in dual polarization direction, but it will lose energy in one polarization direction. If the base station or the UE wants to save energy, the UE needs to report the polarization type (such as one of the above three polarization types) and/or the polarization direction to the base station.

As the polarization direction is related to the arrangement direction of the terminal, for the terminal with the arrangement direction that will not change, it may report its polarization direction to the base station. The polarization direction may be defined as the angle with a predefined direction. For example, the angle with the direction of the ground or sea level, or the angle with the position of the reference signal, etc. For the UE that may switch the polarization direction, the UE may report to the base station whether the polarization direction has been switched. In addition, the base station may achieve the effect of saving power by controlling the polarization direction in which the UE receives or transmits. For example, whether the polarization direction needs to be reversed may be configured in RRC or DCI. For transmission and reception repeated multiple times, the UE may be defined in advance to transmit or receive by way of polling. For example, A direction, B direction, A direction, B direction . . . . In this way, the diversity gain of the channel may be obtained as much as possible.

Because the base station usually estimates the channel state of the UE according to the CSI report from the UE, according to the predefined rules or the configuration of the base station, the UE may use the same or different polarization directions to measure the different antenna ports of the CSI-RS, or the reference signals at different times of the same antenna port. The base station may estimate the current polarization direction of the UE according to the result of the CSI report.

Whether the polarization type of UE antennas is needed or not may be related to the number of UE antennas. For example, the antenna polarization type may be reported only when the UE supports only one antenna.

Figure 6B:
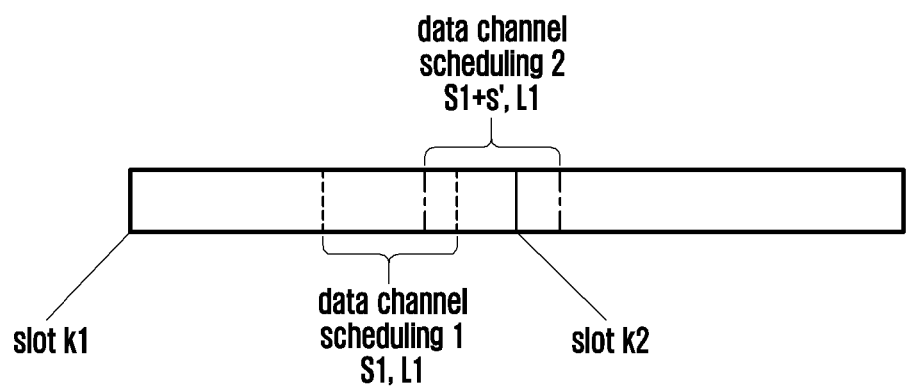
FIG. 6B illustrates transmission of a data scheduling channel according to an embodiment of the disclosure.
Figure 6C:
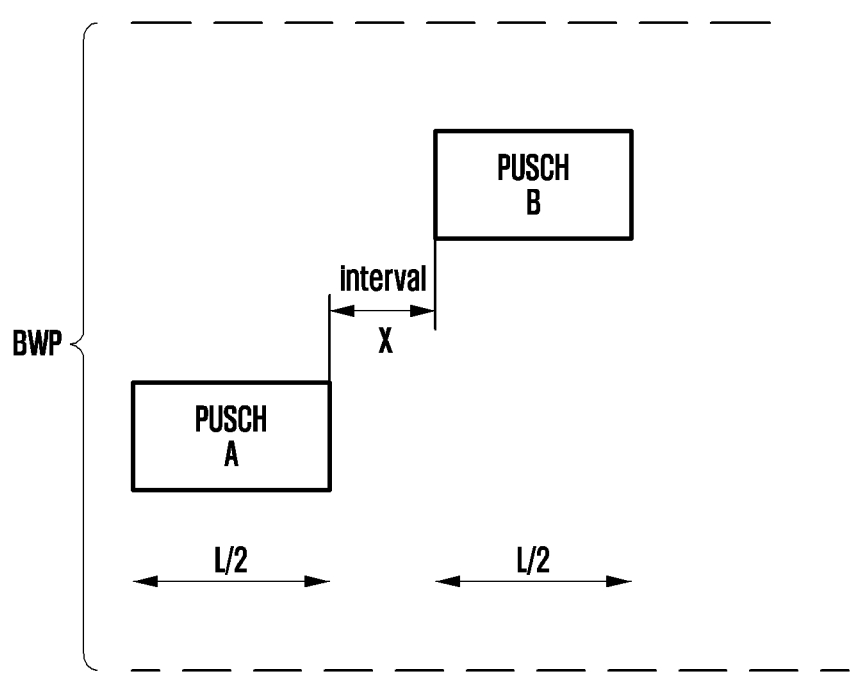
FIG. 6C illustrates time interval insertion/creation according to an embodiment of the disclosure.
Figure 6D:
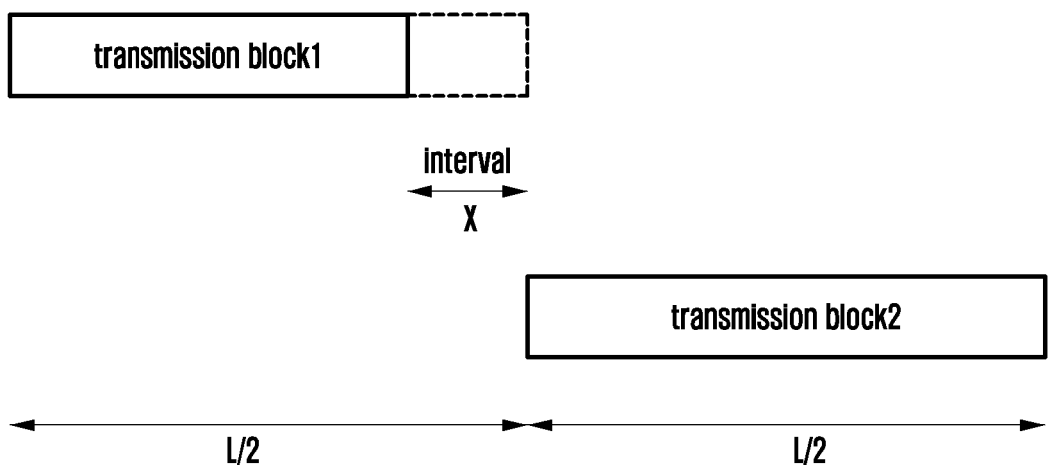
FIG. 6D illustrates time interval insertion/creation according to an embodiment of the disclosure.
Figure 6E:
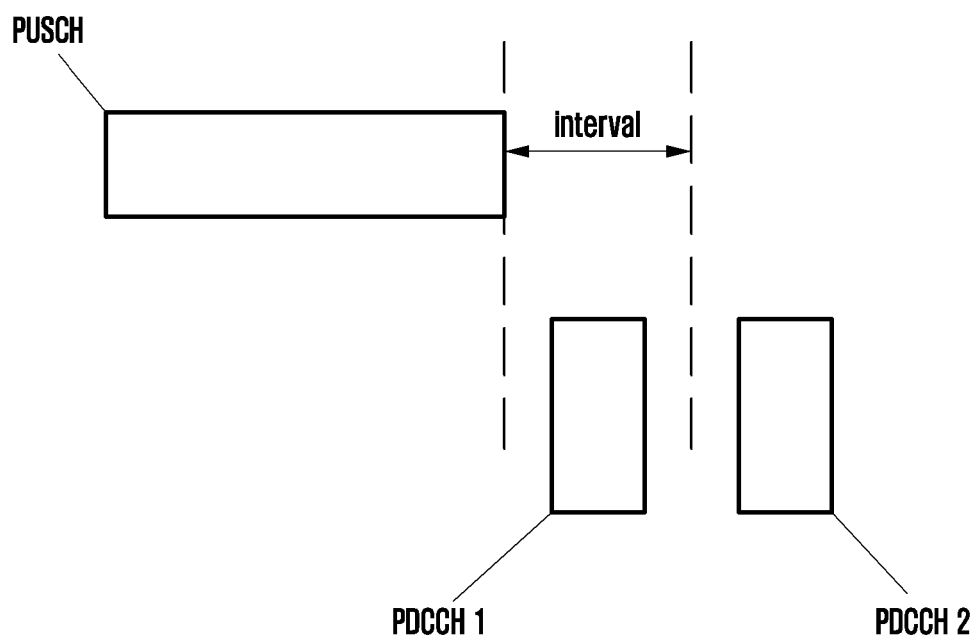
FIG. 6E illustrates channel transmission according to an embodiment of the disclosure.
Figure 6F:
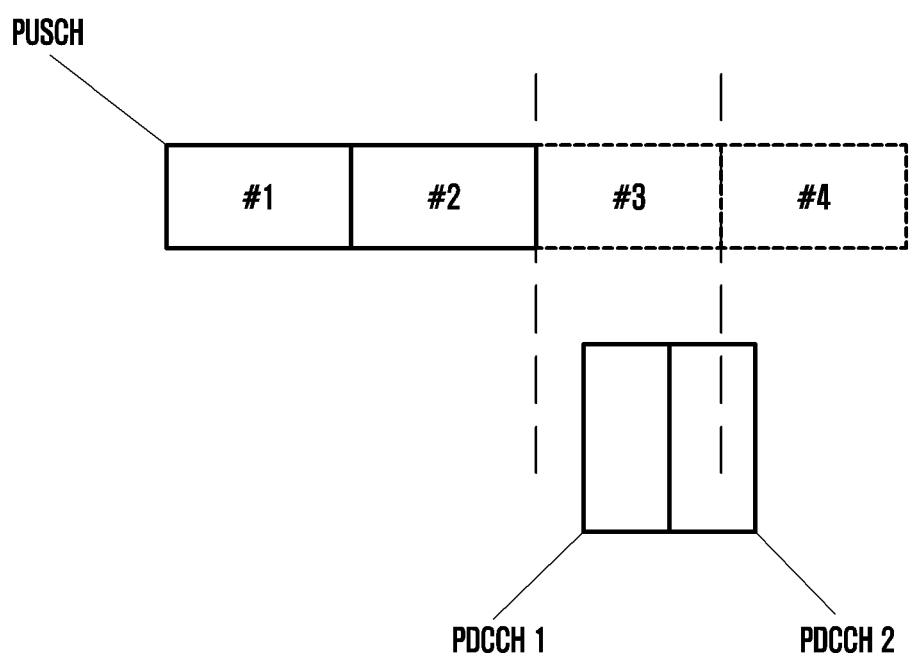
FIG. 6F illustrates channel transmission according to an embodiment of the disclosure.
Figure 6G:
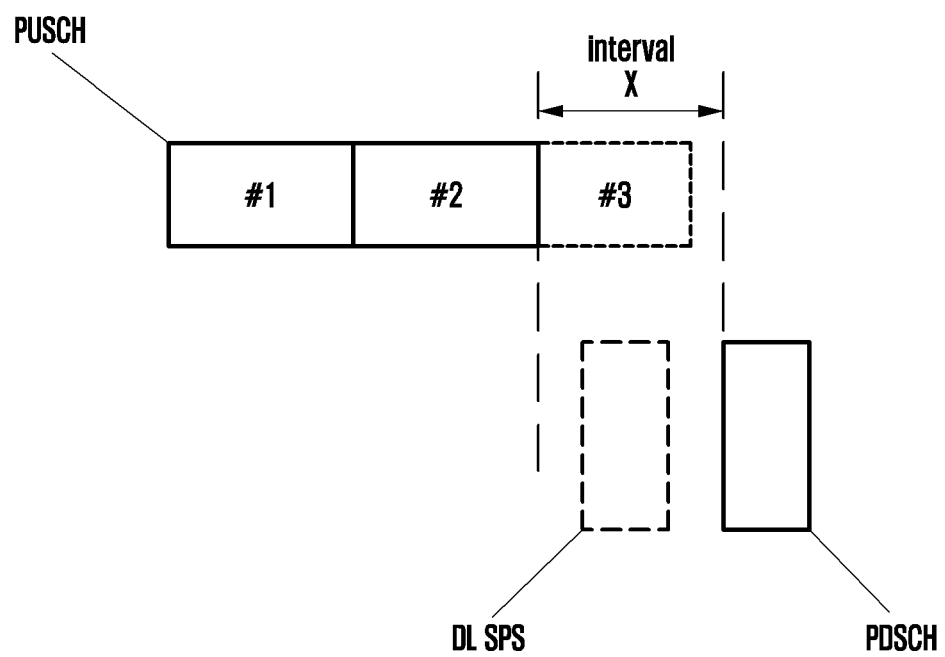
FIG. 6G illustrates channel transmission according to an embodiment of the disclosure.

Next, a method for configuring channel transmission for the UE based on UE capabilities is described in combination with FIGS. 5-6G.

FIG. 5 illustrates a method performed by a user device (UE) in a wireless communication system. When describing each step of FIG. 5, it will be described herein in two cases, A and B.

Referring to FIG. 5, in step 501, the UE transmits a random access request to the base station. The random access request is a PRACH and/or MsgA. However, the random access request may be only one example of a message transmitted by the UE to the base station, and the UE may alternatively transmit other messages to the base station. Optionally or alternatively, the UE may transmit Msg3 and/or Msg5 to the base station. Msg5 is the first uplink message after the base station transmits Msg4 (random access conflict resolution message) to the UE. MsgA resources include the resources of the PRACH in MsgA and/or the corresponding resources of the PUSCH in MsgA. For a two-step random access procedure, the PRACH and PUSCH in MsgA may need different guard periods due to the different UE processing capacities, to adjust the PUSCH transmission by the UE. It is also possible to match the UE capabilities in UE capabilities with specific resource(s) in MsgA one by one.

Step 501 in case A:

The UE may include information on the UE capabilities of the UE in the random access request so that the base station may know the UE capabilities of the UE. In the following, this case is referred to as "case A". As mentioned above, the UE capabilities may include but are not limited to duplex mode, uplink and downlink transition time, PUSCH additional delay time, PDSCH additional delay time, PUCCH additional delay time, retuning time, time from PDCCH scheduling to PUSCH transmission, time from PDCCH scheduling to PDSCH reception, time from PDSCH reception to ACK/NACK feedback, time from CSI triggering to reporting time, time from CSI measuring to reporting, polarization type of UE antennas, number of UE antennas.

The UE may include information on the UE capabilities in the random access request in one of the following ways (mode a1 and mode a2)

(a1) The UE may transmit a random access request through the random access request transmission resources to which the UE capabilities of the UE are mapped based on first mapping relationship between the UE capabilities and the random access request transmission resources predefined or pre-configured by the base station. The first mapping relationship predefined or pre-configured by the base station may be agreed in advance between the UE and the base station, for example, through system information configuration or defined in the protocol in advance.

The First Mapping Relationship Mentioned Above May be as Follows:

One UE capability corresponds to a random access request transmission resource set. Multiple different UEs with the same UE capabilities may use the same or different elements in the same random access request transmission resource set. And multiple different UEs with different UE capabilities use elements in different random access request transmission resource sets respectively. The random access request transmission resources may refer to PRACH sequences, time-frequency positions of MsgA, DMRSs, etc., but are not limited to these. For example, when different UEs, for example, when UE 1 and UE 2 have the same UE capacities, different PRACH sequences in the same PRACH sequence set may be transmitted by UE 1 and UE 2 respectively, or MsgA may be transmitted using different MsgA time-frequency locations in the same MsgA time-frequency location set; and when UE 1 and UE 2 possess different UE capabilities, different PRACH sequences in different PRACH sequence sets may be transmitted by UE 1 and UE 2 respectively, or MsgA may be transmitted using different MsgA time-frequency locations in different MsgA time-frequency location sets.

(a2) The UE may include the UE capabilities of the UE in the uplink channel of the random access request. For example, the UE may include the UE capabilities of the UE in PUSCH of MsgA.

Step 501 in Case B:

The UE may not include information on the UE capabilities of UE in the random access request, so that the base station cannot know the UE capability of the UE in the random access procedure. In the following, this case is referred to as "case B". As mentioned above, UE capabilities may include but are not limited to duplex mode, uplink and downlink transition time, retuning time, PUSCH additional delay time, PDSCH additional delay time, PUCCH additional delay time, time from PDCCH scheduling to PUSCH transmission, time from PDCCH scheduling to PDSCH reception, time from PDSCH reception to ACK/NACK feedback, time from CSI triggering to reporting time, time from CSI measuring to reporting, polarization type of UE antennas, number of UE antennas. In this case, the UE may report the UE capabilities to the base station through messages such as Msg 3/5 or other uplink messages after the random access request. However, the operations of the UE and the base station when reporting the UE capability to the base station through messages such as Msg 3/5 or other uplink messages are not described in detail herein.

In case B, the base station may only configure one PRACH or MsgA resource. Optionally or alternatively, the base station may respectively configure PRACH or MsgA resources for each UE reporting the UE capabilities, but the configured PRACH or MsgA resources overlap partially or completely.

In step 502, the UE receives a random access response (RAR) in response to a random access request from the base station. In the following, step 502 is discussed in accordance with the foregoing case A and case B.

Step 502 in Case A:

Herein first describes how the base station in case A (that is, the random access request contains information on the UE capabilities of UE) acquires the UE capabilities of the UE and how to configure a resource scheduling scheme satisfying the UE capabilities of the UE for the UE (refer to step 702 of FIG. 7 below), and how to transmit the random access response including the time domain resource scheduling indication indicating the time domain resource scheduling scheme to UE (refer to step 703 of FIG. 7 below), and then describes how the UE receives the RAR from the base station.

The Process of the Base Station Acquiring the UE Capabilities of the UE May be as Follows:

For example, the base station may determine the UE capabilities of the UE by the received random access request transmission resources for transmitting the UE capabilities of the UE based on the first mapping relationship between the UE capabilities and the random access request transmission resources predefined or pre-configured by the base station. The random access request transmission resources and the first mapping relationship have been described in detail in step 501, and are not repeated here.

For example, the base station may acquire the UE capabilities of the UE in the uplink channel included in the random access request of UE. As described in step 501, the base station may obtain the UE capabilities of the UE from the PUSCH of MsgA.

The Process of the Base Station Configuring for the UE the Time Domain Resource Scheduling Scheme that Meets the UE's Capabilities May be as Follows:

The base station may automatically configure for the UE the UE resource scheduling scheme matching its UE capabilities according to the UE capabilities. Alternatively, the base station refers to, for example, the predefined time domain resource scheduling schemes under different conditions (if there are multiple conditions) in the protocol, and selects a time domain resource scheduling scheme corresponding to the UE capabilities. The time domain resource scheduling schemes include at least one of the followings: at least one time interval, priority between the at least one time interval and the channel transmission of the UE, and priority between channel transmission of the UE. The at least one time interval includes at least one of the followings: uplink and downlink transition time, retuning time, PUSCH additional delay time, PDSCH additional delay time, PUCCH additional delay time, time from PDCCH scheduling to PUSCH transmission, time from PDCCH scheduling to PDSCH reception, time from PDSCH reception to ACK/NACK feedback, time from CSI triggering to reporting time, time from CSI measuring to reporting. For example, the base station may configure the time interval not less than the required capabilities according to the capabilities reported by the UE. The time intervals under different conditions (if there are multiple conditions) may be defined in the protocol in advance. Then, after the UE reporting capabilities and the base station configuring for the UE the time interval required by the capabilities reported by the UE, the UE and the base station have the same understanding of the time interval. In addition, the base station may respectively configure the above resources corresponding to the PDCCH for different purposes (such as messages different from the indication) for the UE. When the base station does not perform UE specific configuration, the UE will use system information and/or predefined configuration. For example, the monitoring, demodulating and transmitting of the UE for related channels in the random access procedure will utilize system information and/or predefined configuration. For another example, the UE may also use system information and/or predefined configurations for fallback DCI or group common DCI transmitted to multiple UEs, or configure for a group of UEs the information for receiving the group common DCI through UE specific messages. Different processing time or processing time sets may also be defined for various UE processing capabilities in the protocol. For example, different transition times are defined for different uplink and downlink transition time capabilities. For example, for Type A HD FDD UE, its uplink and downlink transition time may be Table 1 above. For Type B HD FDD, the uplink and downlink transition time is a slot (the time unit associated with subcarrier spacing) or one millisecond (absolute time).

The Process of the Base Station Transmitting a Random Access Response Including the Time Domain Resource Scheduling Indication Indicating the Time Domain Resource Scheduling Scheme to the UE May be:

The base station may determine the time domain resource scheduling table used to generate the time domain resource scheduling indication, and generate the time domain resource scheduling indication based on the determined time domain resource scheduling table.

The Base Station May Determine the Time Domain Resource Scheduling Table for Generating the Time Domain Resource Scheduling Indication by One of the Following Methods (Method b1 and Method b2):

(b1) Based on a second mapping relationship between the UE capabilities and the time domain resource scheduling tables predefined or pre-configured by the base station, the base station determines the time domain resource scheduling table to which the UE capabilities corresponding to the configured time domain resource scheduling scheme (in case A, that is, the UE capabilities reported by UE, that is, the UE capabilities received by the base station from the UE) are mapped as the time domain resource scheduling table for generating the time domain resource scheduling indication. The second mapping relationship predefined or pre-configured by the base station may be agreed in advance between the UE and the base station, for example, through system information configuration, or be defined in the protocol in advance.

The time domain resource scheduling table may include, but is not limited to: at least one of a PUSCH time domain resource scheduling table (for example, table 3 described above), a PDSCH time domain resource scheduling table, a PUSCH additional delay table (for example, table 2 described above), a PDSCH additional delay table, a PUCCH additional delay table, an uplink and downlink transition time table (for example, table 1 described above), and retuning time table (for example, table 4 described above). There may be only one element in the above table, that is, a fixed value for any case.

The base station may determine the time domain resource scheduling table based on the UE capabilities reported by the UE through the following example methods. Correspondingly, the UE may also determine the time domain resource scheduling table based on its reported UE capabilities through the following example methods to parse the time domain resource scheduling indication transmitted by the base station.

For example, for a UE reporting a specific UE capability, i.e., a UE transmitting a random access request on a specific PRACH and/or MsgA resources or a UE reporting a specific UE capability in an MsgA message, the base station may schedule time domain resources for the UE to generate the time domain resource scheduling indication, based on a second time domain resource scheduling table (e.g., the second PUSCH time domain resource scheduling table and/or the second PDSCH time domain resource scheduling table and/or the second PUSCH additional delay table and/or the second uplink and downlink transition time table and/or the second retuning time table) that is predefined or configured in the system information (SIB). For another example, for a UE reporting non-specific (general) UE capabilities, that is, a UE transmitting a random access request on general PRACH and/or MsgA resources, or a UE reporting general UE capabilities in an MsgA message, the base station may schedule time domain resources for the UE to generate the time domain resource scheduling indication, based on a first time domain resource scheduling table (for example, the first PUSCH time domain resource scheduling table and/or the first PDSCH time domain resource scheduling table and/or the first PUSCH additional delay table and/or the first uplink and downlink transition time table and/or the first retuning time table and/or the first PDSCH additional delay table and/or the first PUCCH additional delay table) that is predefined or configured in the system information (SIB).

The above specific UE capabilities may be, but are not limited to, for example, PDSCH reception preparation time, and/or PUSCH transmission preparation time of the UE, and/or duplex mode of the UE (for example, whether the UE is HD-FDD UE), and/or uplink and downlink transition time of the UE.

In the above description, the second PUSCH time domain resource scheduling or the second PDSCH time domain resource scheduling table may be defined in the protocol in advance, or may be obtained by adding a fixed (pre-defined protocol or configured by base station) offset to the first PUSCH time domain resource scheduling table or the second PDSCH time domain resource scheduling table. Specifically, table 3 above may be the first PUSCH time domain resource scheduling table, then a fixed value k' can be added to the slot deviation K2 indicated in the first PUSCH time domain resource scheduling table and/or a fixed value s' may be added to the S indicated in the first PUSCH time domain resource scheduling table. k'and s' are integers. The method of adding a fixed value s' to S may cause the transmission of a data channel to cross the boundary of one slot (i.e., S+s'+L>14), then in order to deal with this situation, the following methods (I, II, III) may be adopted:

(I) Adopting the Manner of Type B PUSCH Repeating (as Defined in TS 34.214 of Rel-16); or (II) The base station selects an appropriate PUSCH time domain resource scheduling table and/or PDSCH time domain scheduling table to ensure that one PDSCH or PUSCH does not exceed the boundary of one slot; or, (III) Only a part of the slot may be selected for transmission, and the rest may be discarded.

As shown in FIG. 6B, the base station indicates data channel scheduling 1 to the UE. According to the first PUSCH time domain resource scheduling table and/or the first PDSCH time domain resource scheduling table, the UE obtains that the scheduling is slot K1, the scheduled start position is S1, and the length is L1.

In the case of mode I, the UE may transmit or receive the data channel at data channel scheduling 2. At the edge of the slot, the transmission of the data channel is cut into two actual repetitions, and a pilot is inserted into each actual repetition, where the two actual repetitions constitute a nominal repetition occupying the position of data channel scheduling 2.

In the case of mode II, the UE does not expect the scheduling as shown in FIG. 6B.

In the case of mode III, the data channel will only be transmitted or received in a part of the data channel scheduling 2 that is within slot K1.

(b2) The base station may use a time domain resource scheduling table predefined or pre-configured by the base station as a time domain resource scheduling table for generating the time domain resource scheduling indications. In the case that the base station determines the time domain resource scheduling table predefined or pre-configured by the base station as the time domain resource scheduling table for generating the time domain resource scheduling indications, the random access response also includes an indication for the time domain resource scheduling table predefined or pre-configured by the base station. The indication may be used to indicate one or more of the time domain resource scheduling tables (PUSCH time domain resource scheduling table and/or PDSCH time domain resource scheduling table and/or PUSCH additional delay table and/or uplink and downlink transition time table and/or retuning time table and/or first PDSCH additional delay table and/or first PUCCH additional time table) for the UE.

The time domain resource scheduling tables described above may include but are not limited to at least one of a PUSCH time domain resource scheduling table, a PDSCH time domain resource scheduling table, a PUSCH additional delay table, an uplink and downlink transition time table, a retuning time table, a PDSCH additional delay table and a PUCCH additional delay table.

After the base station determines the time domain resource scheduling table, the base station generates the time domain resource scheduling indications based on the determined time domain resource scheduling table. For example, the base station generates a time domain resource scheduling indication for the UE.

After the time domain resource scheduling indication is generated by the base station, the base station may transmit the RAR, based on the third mapping relationship between the UE capabilities and the RAR transmission resources predefined or pre-configured by the base station, by the RAR transmission resources to which the UE capabilities corresponding to the configured time domain resource scheduling scheme (in case A, that is, the UE capabilities reported by the UE, that is, the UE capabilities received by the base station from UE) are mapped. The RAR transmission resources may be at least one of, but are not limited to, the start position of the RAR window, the length of the RAR window, the RNTI for descrambling the RAR, the PDCCH search space, and the control resource set CORESET. The third mapping relationship predefined or pre-configured by the base station may be agreed in advance between the UE and the base station, for example, through system information configuration or defined in the protocol in advance.

The third mapping relationship described above may be as follows:

A UE capability corresponds to a RAR transmission resource set (such as a RAR window for RAR reception). The base station uses the same or different elements in the same RAR transmission resource set for multiple different UEs with the same UE capabilities. For example, the base station transmits RAR messages for multiple UEs in the same RAR window. Or the base station transmits RAR messages for multiple UEs in different RAR windows. Moreover, the base station uses elements in different RAR transmission resource sets for different UEs with different UE capabilities. For example, the base station transmits RAR messages for multiple UEs in different RAR windows. The RAR transmission resources may refer to the start position of the RAR window, the length of the RAR window, the RNTI for descrambling the RAR, the PDCCH search space, the control resource set CORESET, etc., but are not limited to these. For example, when different UEs, for example, UE 1 and UE 2 have the same UE capabilities, the base station may use the same RNTI to scramble PDCCH for RAR messages of UE 1 and UE 2; and when UE 1 and UE 2 have different UE capabilities, the base station may use different RNTIs to scramble PDCCH for RAR messages of UE 1 and UE 2.

The above has described how the base station obtains the UE capabilities of the UE, how to configure a resource scheduling scheme satisfying the UE capabilities of the UE, and how to transmit a random access response including a time domain resource scheduling indication indicating the time domain resource scheduling scheme to the UE. Next, it will be described how the UE receives the RAR from a base station.

The UE may receive the RAR, based on the fourth mapping relationship between the UE capabilities and the RAR reception resources predefined or pre-configured by the base station, by the RAR reception resources to which the UE capabilities of the UE (in case A, that is, the UE capabilities reported by the UE, that is, the UE capabilities received by the base station from the UE) are mapped. The RAR reception resources may be, but are not limited to, at least one of the start position of the RAR window, the length of the RAR window, the RNTI for descrambling the RAR, the PDCCH search space, and the control resource set CORESET. The fourth mapping relationship predefined or pre-configured by the base station may be agreed in advance between the UE and the base station, for example, through system information configuration or defined in the protocol in advance.

The foregoing fourth mapping relationship may be as follows:

A UE capability corresponds to a RAR reception resource set. Multiple different UEs with the same UE capabilities use different elements in the same RAR reception resource set. And different UEs with different UE capabilities use elements in different RAR reception resource sets. The RAR transmission resources may refer to the start position of the RAR window, the length of the RAR window, the RNTI for descrambling the RAR, the PDCCH search space, the control resource set CORESET, etc., but are not limited to these. For example, when different UEs, for example, UE 1 and UE 2 have the same UE capabilities, the base station may use different RNTIs in the same RNTI set to scramble RARs for UE 1 and UE 2; and when UE 1 and UE 2 have different UE capabilities, the base station may use different RNTIs in different RNTI sets to scramble RARs for UE 1 and UE 2.

Among them, UE capabilities are one-to-one corresponding to the RAR transmission resources (in the third mapping relationship) and the RAR reception resources (in the fourth mapping relationship).

For example, after transmitting the PRACH and MsgA, the UE monitors the PDCCH to receive the random access response (RAR). In some cases, for example, in NR, the UE may turn on the RAR window timer in the first PDCCH search space after transmitting the PRACH, and keep listening on the PDCCH for the RAR until the RAR window timer expires. UEs with different uplink and downlink switching processing capabilities may need different conversion time from uplink transmission to downlink reception. For example, for UEs with limited uplink and downlink switching processing capacities, longer conversion time from uplink transmission to downlink reception may be needed. The time interval between the end of the PRACH transmission and the beginning of the RAR window reception may be different for UEs with different uplink and downlink switching processing capabilities, by predefinition or configuration by the base station. Detailed description is given below in connection with FIG. 6A.

FIG. 6A illustrates a schematic diagram from the PRACH transmission to the RAR window reception according to an embodiment of the disclosure. For a UE with general UE capabilities (such as an NR UE), it starts the RAR window timer at the beginning of the first control resource set CORESET after interval 1 after transmitting the last symbol of the PRACH. As shown in FIG. 6A, the UE starts the RAR window timer at the start position of the first CORESET (i.e., CORESET 1) after interval 1 after transmitting the last symbol of the PRACH, and starts to listen to the PDCCH search space until the RAR window timer expires (e.g., the end of the RAR window 1). For a UE with specific UE capabilities, it needs to go through a longer interval than interval 1 after transmitting the last symbol of the PRACH, for example, the predefined or base station-configured interval 2. As shown in FIG. 6A, since CORESET1 does not satisfy interval 2, then, the UE starts the RAR window timer at the start position of the first CORESET (i.e., CORESET 2) after interval 2 after transmitting the last symbol of the PRACH, and the timing of the RAR window 2 is started until the timer expires (for example, the end of RAR window 2). Similarly, the UE may start timing for 2-step initial access at the first CORESET after transmitting the PUSCH of MsgA.

Step 502, in case B:

How the base station configures a resource scheduling scheme for the UE (refer to step 702 of FIG. 7 below) and how to transmit a random access response including a time domain resource scheduling indication indicating the time domain resource scheduling scheme to the UE (refer to step 703 in FIG. 7 below) in case B (that is, the random access request does not contain information on the UE capabilities of UE) are described first herein, and then it is described how the UE receives the RAR from the base station.

The process of the base station configuring resource scheduling scheme for UE may be as follows:

The base station may utilize two methods (method 1 and method 2) to configure resource scheduling scheme for UE.

The base station and UE may agree whether the base station adopts method 1 or method 2 (such as through protocol specifications or configurations in downlink messages such as system information) in advance.

Method 1:

The base station may configure for the UE a time domain resource scheduling scheme corresponding to the worst UE capabilities predefined or supported by the base station configuration.

For example, if there are multiple UEs with different UE capabilities of which the types are the same but the sizes are different, the base station may configure the time domain resource scheduling scheme for the multiple UEs according to the potential worst UE capabilities at the initial access before acquiring the capabilities of the multiple UEs, for example, the base station may schedule the time interval for the multiple UEs. For example, the base station may reserve enough processing time based on the potential worst UE capabilities. For example, the processing time may include, but not be limited to, in the random access procedure, the minimum processing time between the PRACH and Msg2, the scheduling time between Msg2 and Msg3, the time interval between the UE performing uplink transmission and the UE performing downlink reception after the RRC connection is established, and the time required if the UE needs to perform retuning, etc.

Method 2:

The base station may configure for the UE all the time domain resource scheduling schemes predefined or supported by the base station configurations corresponding to all the UE capabilities predefined or supported by the base station configurations. The UE may select a time domain resource scheduling scheme corresponding to its own UE capabilities. This selection process will be described in detail later.

The process of the base station transmitting a random access response including the time domain resource scheduling indication indicating the time domain resource scheduling scheme to the UE may be:

The base station determines the time domain resource scheduling table used to generate the time domain resource scheduling indication, and the base station generates the time domain resource scheduling indication based on the determined time domain resource scheduling table. Among them, the elements in the time domain resource scheduling table may indicate the time domain resource scheduling scheme. The time domain resource scheduling scheme may include at least one of the followings: at least one time interval, the priority between the at least one time interval and the channel transmission of the UE, and the priority between channel transmission of the UE. The at least one time interval may include at least one of the followings: uplink and downlink transition time, retuning time, PUSCH additional delay time, PDSCH additional delay time, PUCCH additional delay time, time from PDCCH scheduling to PUSCH transmission, time from PDCCH scheduling to PDSCH reception, time from PDSCH reception to ACK/NACK feedback, time from CSI triggering to reporting time, time from CSI measuring to reporting.

The base station determines a time domain resource scheduling table for generating the time domain resource scheduling indication by one of the following methods (methods c1, c2):

(c1) The base station may determine the time domain resource scheduling table to which the UE capabilities corresponding to the configured time domain resource scheduling scheme are mapped as the time domain resource scheduling table for generating the time domain resource scheduling indication, based on the second mapping relationship predefined or pre-configured by the base station between the UE capabilities and the time domain resource scheduling tables.

For example, when the base station uses the method 1 above to configure the time domain resource scheduling scheme for UE, the base station may determine the time domain resource scheduling table to which the worst UE capabilities predefined or supported by the base station configurations are mapped as the time domain resource scheduling table used to generate the time domain resource scheduling indication, based on the second mapping relationship predefined or pre-configured by the base station between the UE capabilities and the time domain resource scheduling tables.

For example, when the base station uses the above method 2 to configure the time domain resource scheduling scheme for UE, the base station may determine the multiple time domain resource scheduling tables to which all the UE capabilities predefined or configured by the base station are mapped respectively as time domain resource scheduling tables used to generate the time domain resource scheduling indication, based on the second mapping relationship predefined or pre-configured by the base station between the UE capabilities and the time domain resource scheduling tables.

(c2) The base station determines the time domain resource scheduling table predefined or supported by the base station configurations as the time domain resource scheduling table for generating the time domain resource scheduling indication. In case that the base station determines the time domain resource scheduling table predefined or supported by the base station configurations as the time domain resource scheduling table for generating the time domain resource scheduling indication, the random access response further includes the indication for the time domain resource scheduling table predefined or supported by the base station configurations.

In particular, when the base station adopts the above method 2 to configure the time domain resource scheduling scheme for UE, the time domain resource scheduling tables for all UE capabilities predefined or supported by the base station configurations that may be configured by the base station may be the same, different, or partially the same.

After the base station determines the time domain resource scheduling table, the base station generates the time domain resource scheduling indication based on the determined time domain resource scheduling table. The time domain resource scheduling indication may be, for example, an index value of an element in the time domain resource scheduling table, but is not limited to this.

For example, when the base station configures a time domain resource scheduling scheme for UE using the above method 1, the base station generates a time domain resource scheduling indication for UE.

For another example, when the base station configures a time domain resource scheduling scheme for UE using the above method 2, the base station generates multiple time domain scheduling indications for UE because it configures multiple time domain resource scheduling schemes for UE. The number of multiple time domain resource scheduling schemes is the same as that of multiple time domain scheduling indications generated by the base station for UE.

After the base station generates the time domain resource scheduling indication, the base station may, based on the third mapping relationship predefined or pre-configured by the base station between the UE capabilities and the RAR transmission resources, transmit RAR through the RAR transmission resource to which the UE capabilities (in case B, the worst UE capabilities predefined or supported by the base station configurations (method 1) or all UE capabilities predefined or supported by the base station configurations (method 2)) corresponding to the configured time domain resource scheduling scheme are mapped. The third mapping relationship has been described above and will not be repeated here.

The RAR transmission resource may be at least one of, but is not limited to, the start position of the RAR window, the length of the RAR window, the RNTI for descrambling the RAR, the PDCCH search space, and the control resource set CORESET. When the RAR is transmitted through the RAR transmission resources to which the worst UE capabilities (method 1) predefined or supported by the base station configurations are mapped, it will cause the UE with the best UE capabilities to endure longer random access delay, etc. When the RAR is transmitted through the RAR transmission resources to which all UE capabilities (method 2) predefined or supported by the base station configurations are mapped, the base station may, for example, scramble the PDCCH of RAR with a plurality of RNTIs which respectively corresponds to all UE capabilities predefined or supported by the base station configurations, so as to transmit RAR including PDCCH scrambled utilizing the plurality of RNTIs respectively to the UE.

For example, in method 2 of case B, in order to ensure that existing UEs in the network are not affected, the base station and UE may agree in advance that the UE capabilities of a new UE are different from those of the existing UEs, so the RNTIs in a RNTI set which is different from the RNTI set applied to the existing UEs may be designed for the new UE. Thus, PDCCHs scrambled utilizing different RNTIs are used for UEs with different UE capabilities. For example, UE 1 receives the PDCCH scrambled utilizing RNTI 1 and obtains an uplink grant according to the corresponding first time domain resource scheduling table. UE 2 receives the PDCCH scrambled utilizing RNTI 2 and obtains an uplink grant according to the corresponding second time domain resource scheduling table. From the perspective of the base station, when it does not know the capabilities of UE 1 and UE 2 transmitting the PRACH, it may need to transmit to UE 1 and UE 2 the PDCCH (or PDCCH and PDSCH) scrambled with respective one RNTI in all RNTI sets predefined or supported by the base station configurations. This method will generate more downlink overhead.

The above has described how a base station configures a resource scheduling scheme for the UE and how to transmit a random access response including a time domain resource scheduling indication indicating the time domain resource scheduling scheme to the UE. Next, it will be described how the UE receives the RAR from a base station herein.

When the base station configures the time domain resource scheduling scheme for the UE with the above method 1, the UE may receive the RAR, based on a fourth mapping relationship predefined or pre-configured by the base station between the UE capabilities and the RAR reception resources, by the RAR reception resources to which the worst UE capabilities predefined or supported by the base station configurations are mapped. The fourth mapping relationship has been described above and will not be repeated here. The RAR reception resources may be, but not limited to, at least one of the start position of the RAR window, the length of the RAR window, the RNTI for descrambling the RAR, the PDCCH search space, and the control resource set CORESET.

As mentioned above, the UE capabilities are one-to-one corresponding to the RAR transmission resources (in the third mapping) and the RAR reception resources (in the fourth mapping).

When the base station configures the time domain resource scheduling scheme for the UE with the above method 2, the UE may receive the RAR through the RAR reception resources to which the UE capabilities of the UE are mapped based on the fourth mapping relationship predefined or pre-configured by the base station between the UE capabilities and the RAR reception resources. The RAR reception resources may be, but not limited to, at least one of the start position of the RAR window, the length of the RAR window, the RNTI for descrambling the RAR, the PDCCH search space, and the control resource set CORESET.

When the base station uses the above method 2 to configure the time domain resource scheduling scheme for the UE, because the UE does not report the UE capabilities to the base station through PRACH and/or MsgA, the base station cannot obtain the UE capabilities of the UE through the detection (or decoding) of the PRACH or MsgA, therefore, the base station may only transmit the RAR conservatively. Specifically, referring to FIG. 6A again, it is assumed that for UEs with different UE capabilities, different intervals (for example, interval 1 and interval 2) from the end of the PRACH transmission to the RAR window reception are defined in advance, then the UE corresponding to interval 1 will listen to the PDCCH indicating the RAR in the RAR window 1 starting from CORESET 1; the UE corresponding to interval 2 will listen to the PDCCH indicating the RAR in the RAR window 2 starting from CORESET 2. Since the base station does not know the capabilities of the UE at this time, the base station may transmit the PDCCH for indicating the RAR in the search space of the overlapping part of the RAR window 1 and RAR window 2.

Although when the base station adopts the above method 2 to configure the time domain resource scheduling scheme for the UE, the base station may transmit the RAR through the RAR transmission resources to which all the UE capabilities (method 2) predefined or supported by the base station configurations are mapped, for example, the base station may use multiple RNTIs respectively corresponding to all the UE capabilities predefined or supported by the base station configurations to scramble the PDCCH in the RAR, however, what the UE wants to know is only the time domain resource scheduling scheme corresponding to its own UE capabilities, rather than the scheduling schemes corresponding to all the UE capabilities predefined or supported by the base station configurations. By using the RAR reception resources corresponding to its own UE capabilities, the UE may obtain the information corresponding to its own UE capabilities in the RAR. For example, the UE may use the RNTI corresponding to its own UE capabilities to descramble only the PDCCH corresponding to its own capabilities from multiple PDCCHs scrambled by the base station utilizing the RNTIs respectively corresponding to all the UE capabilities predefined or supported by the base station configurations. Thus, in the subsequent operation 503, the UE may obtain the time domain resource scheduling indication from the PDCCH.

In step 503, the UE obtains the time domain resource scheduling scheme configured by the base station for the UE by parsing the time domain resource scheduling indication in the random access response. In the following, step 503 is discussed in accordance with the foregoing case A and case B. The time domain resource scheduling indication may be, for example, an index value of an element in a time domain resource scheduling table, but is not limited to this. The elements in the time domain resource scheduling table may be time domain resource scheduling schemes.

Step 503, in case A:

In case A, that is, when the random access request contains information on the UE capabilities of the UE, the UE may determine the time domain resource scheduling table for parsing the time domain resource scheduling indication, and parse the time domain resource scheduling indication through the determined time domain resource scheduling table.

In the case that the random access request contains information on the UE capabilities of the UE, the UE may determine the time domain resource scheduling table for parsing the time domain resource scheduling indication by one of the following ways:

For example, the UE may determine the time domain resource scheduling table to which the UE capabilities of the UE are mapped as the time domain resource scheduling table for parsing the time domain resource scheduling indication, based on the second mapping relationship predefined or pre-configured by the base station between the UE capabilities and the time domain resource scheduling tables. The second mapping relationship predefined or pre-configured by the base station between the UE and the base station may be agreed in advance, for example, through system information configurations or defined in the protocol in advance. For example, when the capabilities of the UE are specific UE capabilities, the UE may parse the time domain resource scheduling indication transmitted by the base station for the UE, based on the second time domain resource scheduling table (the second PUSCH time domain resource scheduling table and/or the second PDSCH time domain resource scheduling table and/or the second PUSCH additional delay table and/or the second PDSCH additional delay table and/or the second PUCCH additional delay table and/or the second uplink downlink transition time table and/or the second retuning time table) that is predefined or configured in the system information (SIB). For another example, when the UE's capabilities are non-specific (general) UE capabilities, the UE may parse the time domain resource scheduling indication transmitted by the base station for the UE, based on the first time domain resource scheduling table (the first PUSCH time domain resource scheduling table and/or the first PDSCH time domain resource scheduling table and/or the first PUSCH additional delay table and/or the first PDSCH additional delay table and/or the first PUCCH additional delay table and/or the first uplink downlink transition time table and/or the first retuning time table) that is predefined or configured in the system information (SIB). For another example, the UE may adopt the second time domain resource scheduling table when parsing the time domain resource scheduling indication detected in a specific search space/CORESET (control resource set), or scheduled by the PDCCH scrambled by a specific RNTI, while the first time domain resource scheduling table is adopted when the UE parses the time domain resource scheduling indication detected on other search spaces/CORESETs, or scheduled by the PDCCHs scrambled by other RNTIs.

For another example, the UE may obtain the indication of the time domain resource scheduling table from the RAR and determine the indicated time domain resource scheduling table as the time domain resource scheduling table for parsing the time domain resource scheduling indication. The indication of the time domain resource scheduling table may be used to indicate one or more of the time domain resource scheduling tables (PUSCH time domain resource scheduling table and/or PDSCH time domain resource scheduling table and/or PUSCH additional delay table and/or PDSCH additional delay table and/or PUCCH additional delay table uplink and downlink transition time table and/or retuning time table) for the UE. According to the indication, the UE may determine which time domain resource scheduling table to use to parse the time domain resource scheduling indication transmitted by the base station for the UE.

The time domain resource scheduling indication may be, for example, an index value of an element in a time domain resource scheduling table, but is not limited to this.

After determining the time domain resource scheduling table (for example, PUSCH time domain resource scheduling table and/or PDSCH time domain resource scheduling table and/or PUSCH additional delay table and/or PDSCH additional delay table and/or PUCCH additional delay table and/or uplink downlink transition time table and/or retuning time table), the UE always uses the time domain resource scheduling table to parse the time domain resource scheduling indication of the base station.

Step 503, in case B:

In case B, that is, when the random access request does not contain information on the UE capabilities of the UE, the UE may determine the time domain resource scheduling table used to parse the time domain resource scheduling indication, and parse the time domain resource scheduling indication by the determined time domain resource scheduling table. For example, the result of the parsing may be an element in the time domain resource scheduling table, and the element may be a time domain resource scheduling scheme.

The UE may determine the time domain resource scheduling table for parsing the time domain resource scheduling indication by one of the following methods (d1, d2):

(d1) In the case that the base station configures for the UE a time domain resource scheduling scheme corresponding to the worst UE capabilities predefined or supported by the base station configurations, the UE may determine the time domain resource scheduling table to which the worst UE capabilities predefined or supported by the base station configurations are mapped as the time domain resource scheduling table for parsing the time domain resource scheduling indication, based on the mapping relationship predefined or pre-configured by the base station between the UE capabilities and the time domain resource scheduling tables.

Or the UE may obtain the indication of the time domain resource scheduling table from the RAR and determine the indicated time domain resource schedule table as the time domain resource scheduling table used to parse the time domain resource scheduling indication.

(d2) In the case that the base station configures for the UE all the time domain resource scheduling schemes predefined or supported by the base station configurations corresponding to all the UE capabilities predefined or supported by the base station configurations (method 2), the UE may determine the time domain resource scheduling table to which the UE capabilities are mapped as the time domain resource scheduling table for parsing the time domain resource scheduling indication, based on the mapping relationship predefined or pre-configured by the base station between the UE capabilities and the time domain resource scheduling tables.

Or the UE may obtain the indication of the time domain resource scheduling table from the RAR and determine the indicated time domain resource schedule table as the time domain resource scheduling table for parsing the time domain resource scheduling indication.

The above describes the process of the UE parsing the time domain resource scheduling indication in the random access response to obtain the time domain resource scheduling scheme configured by the base station for the UE. However, the time domain resource scheduling indication may be other indication values, and the UE's method for parsing the time domain resource scheduling indication is not limited to this.

In a TDD system, on a set of symbols of a set of slots, if the UE is configured by the upper layer (e.g., RRC) to receive a PDCCH or PDSCH or a CSI-RS or a downlink positioning reference signal (PRS), and if the UE does not detect the DCI indicating that the UE transmits a PUSCH, PUCCH, PRACH, or SRS on at least one symbol of the set of symbols of the set of slots, the UE receives the PDCCH, PDSCH, CSI-RS, or DL PRS; Otherwise, the UE does not receive the PDCCH, PDSCH, CSI-RS, or DL PRS on the set of symbols of the set of slots.

Similarly, in a TDD system, if the UE is configured by the upper layer (e.g., RRC) to transmit an uplink channel on a set of symbols of a set of slots, if the UE receives the downlink reception indicated by a DCI, it will not cancel (discard) the uplink transmission within a predetermined time, and cancel (discard) the uplink transmission after a predetermined time.

For a TDD system, when SSB reception is performed on a set of symbols in a slot indicated by system information SIB1 or an information element ssb-PositionsInBurst within ServingCellConfigCommon, the UE will not transmit the PUSCH, PUCCH and PRACH on a symbol overlapping with any symbol of the set of symbols in this slot, and the UE will not transmit the SRS. In addition, the UE does not expect to be configured as uplink in the set of symbols, for example in tdd-UL-DL-ConfigurationCommon, or tdd-UL-DL-ConfigurationDedicated configuration.

On a valid RACH opportunity (RO) and N gap symbols in front of the valid RO, the UE does not receive downlink signals, nor does it expect to be configured (for example, through RRC) as downlink symbols.

For the CORESET for Type0-PDCCH CSS indicated in MIB, the UE does not expect to be configured (for example, through RRC) as uplink.

In step 504, the UE sets channel transmission of the UE based on the time domain resource scheduling scheme. In this step, the method for setting channel transmission of the UE is the same for case A and case B, so it is not distinguished here.

The time domain resource scheduling scheme may include at least one of the following: at least one time interval, the priority between the at least one time interval and the channel transmission of the UE, and the priority between channel transmission of the UE. The at least one time interval may include at least one of the following: the uplink and downlink transition time, the retuning time, the PUSCH additional delay time, the PDSCH additional delay time, the PUCCH additional delay time, the time from PDCCH scheduling to PUSCH transmission, the time from PDCCH scheduling to PDSCH reception, the time from PDSCH reception to ACK/NACK feedback, the time from CSI triggering to reporting, the time from CSI measuring to reporting.

Specifically, the following describes a method for setting channel transmission of the UE from four aspects (e1, e2, e3, e4).

(e1) Setting at least one time interval in the channel

The UE may insert/create time intervals by one of the following methods (f1 and f2). However, these two ways are just examples, and others are possible.

(f1) Inserting time intervals outside the number of symbols of the scheduling.

For example, an interval X is inserted between two PUSCH transmission blocks. As shown in FIG. 6C, PUSCH A and PUSCH B are two transmission blocks after frequency hopping of one PUSCH scheduling. L is the number of symbols indicated in an uplink grant. Then, according to the predefined rules, the previous and latter two transmission blocks have L/2 symbols respectively. In method f1), the interval X is inserted additionally outside the scheduled symbol L, so the interval X is inserted between PUSCH A and PUSCH B. The same method may be applied to the downlink PDSCH transmission, or transmission of other types of channels such as PUCCH and the like.

(f2) Creating time intervals within the scheduled symbols.

For example, several symbols in a predefined transmission block are discarded. As shown in FIG. 6D, transmission block 1 and transmission block 2 may be two transmission blocks after frequency hopping of one PUSCH scheduling. L is the number of symbols indicated in an uplink grant. Then, according to the predefined rules, the previous and latter two transmission blocks have L/2 symbols respectively. Due to the limited UE capabilities, an interval X needs to be created within the L symbols of the scheduling. Then, according to the predefined or configured rules, the UE creates the interval X in the last several symbols of the first L/2 (also for other time units, such as a sample, a timeslot, etc.). This predefined or configured rule may include, but not limited to, the length and/or location of the created interval. Similarly, the same method may be applied to the downlink PDSCH transmission, or transmission of other types of channels such as PUCCH and the like. For downlink reception, the base station may transmit all the information as usual, while the UE selectively receives part of the information according to its own capability. Similarly, for uplink transmission, the protocol may stipulate that the UE is not required to transmit in the interval X, but if the UE may transmit, the UE may transmit as much as possible. At this time, the base station may assume that the UE has transmitted all and decode, or may decode according to the minimum requirements for the UE. Compared with method f1, method f2 gives the UE and the base station more flexible operation.

The above methods of inserting or creating intervals are applicable to several PUSCH/PDSCH transmission blocks (including transmission blocks caused by frequency hopping or repetition) of one PUSCH/PDSCH transmission; or between PUSCH/PDSCH transmissions in two different frequency-domain locations; or, between uplink transmission and downlink reception, etc.

(e2) Setting the channel transmission based on the priority of channels of the UE The priority between channels of the UE may be determined according to predefined rules.

The UE may, for example, carry out the uplink transmission according to the time domain resource scheduling scheme of the base station, and carry out the downlink reception or monitoring at other times (except the interval time).

Specifically, for example, the UE monitors the downlink configuration PDCCH search space. If there is one slot or symbol, on which the base station configures for the UE the uplink transmission scheduled by dynamic or RRC (such as the PRACH/SRS scheduled by PUSH/PUCCH/DCI), etc., then the uplink transmission will be carried out, and, the downlink reception is not performed at a certain interval before and/or after the scheduled uplink transmission. Alternatively, a certain interval is inserted or created in the corresponding position according to the method of inserting or creating intervals above, for UE tuning and other operations.

For example, the uplink transmission priority of dynamic scheduling (PDCCH) is the highest. Particularly, for example, the UE monitors the downlink configuration PDCCH search space. If the base station configures the UE with an uplink transmission through dynamic scheduling (such as PRACH/SRS for PUSCH/PUCCH/DCI scheduling) on a slot or symbol, the UE performs the uplink transmission on the slot or symbol without monitoring the PDCCH search space, and, the downlink reception is not performed at a certain interval before and/or after the scheduled uplink transmission (for example, PDCCH search space monitoring is not performed, and/or PDSCH and/or CSI-RS reception and/or PRS reception configured by RRC are not performed). Furthermore, it may be configured or pre-defined that the priority of the uplink transmission scheduled by PDCCH is higher than that of the downlink reception scheduled by PDCCH.

The priority of the dynamic downlink reception is higher than that of the uplink transmission configured by the RRC. If the base station configures the uplink transmission scheduled by the RRC for the UE on a slot or symbol, such as PUSCH, PUCCH, SRS, PRACH, etc. configured by the RRC, the UE does not perform the uplink transmission on the slot or symbol, but performs the dynamic downlink reception (PDSCH reception or CSI-RS reception based on the PDCCH scheduling, and PRS reception based on the dynamic indication, etc.). Moreover, the uplink transmission is not performed (discarded) at a certain interval before and/or after the scheduled dynamic downlink reception. In NR, since the decoding of PDCCH takes a certain time, the uplink transmission may be cancelled (discarded) only within a certain time A after the last symbol of COREST where PDCCH is located, according to the UE capability. A is the preparation time of PUSCH. For the UE that needs tuning or uplink and downlink switching, a new PUSCH preparation time A' may be obtained by adding a certain additional time AA to the preparation time A. Among them, the additional time AA or the new PUSCH preparation time A' is determined according to the capability of the UE.

Additionally or alternatively, the UE may determine the highest priority signal according to rules predefined or pre-configured by the base station, and carry out the downlink reception or uplink transmission. For example, the rules (A) predefined or pre-configured by the base station may be at least one of the followings:

The priority of PDSCH/PDCCH>the priority of PUSCH/PUCCH/REACH/SRS>the priority of CSI measuring;

The priority of PRACH>the priority of PDSCH/PDCCH>the priority of PUSCH/PUCCH/SRS>the priority of CSI measuring;

The priority of PRACH/PUCCH carrying HARQ-ACK>the priority of PDSCH/PDCCH>PUSCH/PUCCH carrying other UCI/SRS>the priority of CSI measuring;

The priority of a specific type of PDSCH/PDCCH>the priority of PRACH>the priority of other types of PDSCH/PDCCH>PUSCH/PUCCH/SRS>the priority of CSI measuring;

The priority of a specific type of PRACH/PUCCH/PUSCH>the priority of PDSCH/PDCCH>the priority of CSI measuring;

The priority of a specific type of PDSCH/PDCCH>the priority of a specific type of PRACH>the priority of CSI measuring;

The priority of dynamic PUSCH>the priority of dynamic PDSCH>the priority of CG PUSCH>the priority of DL SPS/PDCCH/CSI measuring;

The priority of dynamic PUSCH pilot symbol>the priority of dynamic PDSCH pilot symbol>the priority of dynamic PUSCH data symbol>the priority of dynamic PDSCH data symbol.

The specific type of channels may be the channels with higher priority in channels with different priorities. Or it may be the channels based on dynamic scheduling or semi-persistent scheduling. The priority of the intervals inserted or created according to a certain channel or signal may be equal to that of the channel or signal. Alternatively, intervals may be created or inserted on low priority channels or signals. In addition, only part of each rule or combination of parts of multiple rules of the above rules may be used.

For the discarding of PDCCH channels, the unit may be time units such as search space, CORESET, symbol, sampling point, etc.

For the discarding of PUSCH and PDSCH, the unit may be time units such as one or more symbols, one or more sampling points, one repeat transmission, all repeat transmissions belonging to PUSCH or PDSCH, etc.

For CSI measuring, the discarding of SRS transmission, the unit may be time units such as one or more symbols, one or more sampling points, one or more configurations, etc.

If the uplink transmission (such as configured grant (CG), SRS, UCI) and downlink reception (such as PDCCH search space and/or downlink CSI, RRM measuring, etc.) are configured through the RRC on the same symbol or slot at the same time, the uplink transmission or downlink reception may be discarded through at least one of the following methods (B):

Discarding according to the configured priority of the channel: if the channel has a configured priority, it is determined according to the channel priority; if there is no configured priority, it is selected according to the predefined rules.

Discarding according to the order configured by the base station. For example, the uplink transmission or downlink reception is discarded, according to the pre-configured rules (A) of the base station, or the priority order of the uplink and downlink configured by the base station, or the priority order of different channels.

Discarding according to the predefined rules: for example, the uplink transmission takes precedence over the downlink reception; if for repeating many times, the repeated part of the repeated channel has lower priority. For another example, the uplink transmission or downlink reception is discarded according to the pre-configured rules (A) of the base station.

In addition, if the UE is configured with the slot format indicated by the dynamic SFI, the UE may expect the base station to solve the above conflicts through the dynamic SFI, for example, indicating one of the uplink transmission or downlink reception, and/or discarding one of the uplink transmission or downlink reception. If the conflict between uplink transmission or downlink reception is configured, the UE considers it as an error configuration.

If the UE does not receive the SFI (e.g., the PDCCH used to carry the SFI is not decoded successfully), it may decide to carry out uplink transmission or downlink reception, and/or discard one of the uplink transmission or downlink reception, according to one of the above methods (B). Or the UE discards the uplink transmission and downlink reception at the same time, in the symbol or slot where the conflict occurs, with the time unit corresponding to the above channels as a unit. Among them, conflicts may be one or more of the followings: conflicts between the uplink transmission and downlink reception, conflicts between symbols before or after the uplink transmission and the downlink reception, conflicts between symbols before or after the downlink reception and the uplink transmission. For the above conflicts, the same solution or different solutions may be chosen.

For example, if the UE needs to receive the SSB, the UE may ignore the uplink transmission; or if the UE needs to carry out the uplink transmission, the UE may not need to receive the SSB. Specifically, different processing methods are used for the dynamic uplink scheduling or semi-persistent uplink scheduling configured by RRC. For example, for the dynamic uplink scheduling, the UE carries out the uplink transmission without receiving the SSB. For the configured uplink scheduling, the SSB is considered as a downlink symbol, and the uplink transmission is not performed. The uplink transmission may include at least one of the followings: PUSCH, PUCCH, PRACH and SRS.

In addition, if the UE is configured with the slot format indicated by the dynamic SFI, the UE may expect the base station to indicate the relationship between the reception of the SSB and the uplink transmission through the dynamic SFI. For example, if the base station indicates that the set of symbols or slots is uplink, the UE performs the semi-persistent and/or dynamically scheduled uplink transmission. If the base station indicates that the set of symbols or slots are flexible, the UE performs the dynamic uplink transmission and cancels the semi-persistently scheduled uplink transmission. If the base station indicates that the set of symbols or slots are flexible, the UE considers that the symbols are downlink and does not perform the uplink transmission.

If the UE does not receive the SFI (e.g., the PDCCH used to carry the SFI is not decoded successfully), it may decide to carry out the uplink transmission or downlink reception (e.g., SSB reception) and/or discard one of the uplink transmission or downlink reception according to one of the above methods (B). Or the UE discards the uplink transmission and downlink reception at the same time, in the symbol or slot where the conflict occurs, with the time unit corresponding to the above channels as a unit. Among them, conflicts may be one or more of the following: conflicts between the uplink transmission and downlink reception, conflicts between symbols before or after the uplink transmission and the downlink reception, conflicts between symbols before or after the downlink reception and the uplink transmission. For the above conflicts, the same solution or different solutions may be chosen.

For methods that need uplink and downlink switching time, the switching time between uplink and downlink (such as interval X) may be bound with high priority. For example, if uplink transmission is performed, the switching interval between the uplink transmission and downlink reception is processed as the same priority as the uplink transmission.

In addition, in a TDD system, a set of symbols carrying the SSB are regarded as downlink symbols. But for an HD-FDD UE operating in an FDD band, because it is an FDD spectrum, the base station may transmit the SSB and carry out uplink reception on another FDD frequency at the same time. For the UE, the reception of the SSB is usually not performed in the connected state, so the base station may instruct the UE to perform uplink transmission on the symbol where the SSB is in the connected state. For example, if the set of symbols is indicated as uplink symbols by uplink dynamic scheduling or SFI, the UE performs uplink transmission. Among them, the uplink dynamic scheduling may be PUSCH, PUCCH, SRS, etc. Or, for semi-persistent uplink transmission, the UE may be allowed to choose to perform uplink transmission or SSB reception spontaneously. For semi-persistent uplink transmission, it may also be predefined to perform SSB reception without performing uplink transmission. Among them, semi-persistent uplink transmission may be semi-persistent scheduled/configured grant PUSCH, or other semi-persistent uplink transmission, such as transmission of PUCCH for downlink semi-persistently scheduled PDCCH or semi-persistently indicated SRS transmission. It also may be allowed that only the UE itself chooses whether to transmit the configured grant PUSCH or not, and if the base station configures skipping of the uplink configured grant, the UE may be allowed to choose by itself, and if the base station does not configure the skipping of the uplink configured grant, other methods may be adopted to process, such as canceling the transmission of configured grant PUSCH that overlaps with the SSB. The base station configures one or more of the above processing methods to the UE according to each channel and/or scheduling mode.

As shown in FIG. 6F, according to a RRC configuration, the UE needs to transmit the PUSCH and repeat #1-#4 for 4 times, meanwhile, the base station is configured to monitor the PDCCH on CORESET1 and CORESET2. According to the rules, since there are four repetitions for the PUSCH, then the UE tries to complete transmission of one PUSCH repetition, and then monitors the PDCCH. Then the UE will transmit PUSCH #1 and PUSCH #1, and receive on CORESET1 and CORESET2. The parts of PUSCH #3 and PUSCH #4 overlapped with CORESET1 and CORESET2 are not transmitted.

As shown in FIG. 6G, the UE may need to transmit the PUSCH (or other uplink channels) at certain time position according to the RRC configuration and the dynamic configuration, if there is overlapping downlink semi-persistent SPS reception (for example, at least one of the downlink SPS PDSCH, semi persistent CSI-RS and PRS reception), the UE will not receive downlink SPS reception according to the predefined or configured rules (As the previous rules (A)). Different processing methods may be used for dynamically configured uplink transmission and RRC configured uplink transmission (as shown in rules (A) above). The same method for the downlink semi-persistent SPS reception may be applied to the PDCCH monitoring.

If the UE has PDSCH with dynamic configuration later, no transmission of the uplink channel such as the semi-persistent PUSCH and the like is performed in interval X before dynamic PDSCH. For example, uplink channels such as semi-persistently configured PUSCH are only transmitted until before interval X, and part of the symbols or slots or one-time PUSCH or repetitive transmission of PUSCH that overlap with interval X will be discarded. Similarly, if there is dynamic PDSCH in the interval X before the transmission of uplink channels such as the semi-persistent scheduling PUSCH, the uplink transmission such as the semi-persistent PUSCH is not performed. For example, the uplink channels such as the semi-persistently configured PUSCH are only transmitted till before interval X, and some symbols or slots or repetitive transmissions of uplink channels such as one-time PUSCH that overlap with the interval X will be discarded. Where the interval X may be zero. Alternatively, the interval X may be related to the timing advance (TA) of the transmission, or the uplink and downlink switching capability of the UE. In particular, because the UE will perform the transmission timing advancing, the interval X before the transmission of uplink channels such as the PUSCH and the interval X after the transmission of uplink channels such as the PUSCH may be different. For example, the interval X before the transmission of uplink channels such as the PUSCH is greater than that after the transmission of uplink channels such as the PUSCH. In addition, the interval may be the interval of slots or the interval between the actual transmission time and the downlink reception. Since the UE will apply timing advancing to uplink transmission, an interval will be generated to the corresponding downlink slot position after the uplink transmission. The interval due to the timing advance may be used for the switching from the uplink transmission to the downlink reception, thus, the internal X of the downlink reception may not be introduced after the transmission of uplink channels such as the PUSCH. The interval X before the transmission of uplink channels such as the PUSCH and after the transmission of uplink channels such as the PUSCH may be configured by the base station respectively, or determined by the UE according to TA. This configuration and determination method of interval X is also applicable to the uplink and downlink switching interval X in other parts of this description.

If the PUSCH is a dynamic PUSCH, the UE may discard the last PUSCH part or whole PUSCH according to the predefined rules and receive the PDSCH. It is also possible that the UE completes the PUSCH transmission without the PDSCH reception. Alternatively, the UE ensures the transmission or reception of pilot symbols while discarding the transmission or reception of the data part. The PUSCH may be replaced by other uplink channels, such as SRS, PUCCH, PRACH, etc.

In particular, for the processing of the PRACH, different processing methods may be adopted for the PRACH scheduled by the PDCCH and the PRACH transmitted spontaneously by the UE. For example, the PRACH scheduled by the PDCCH adopts the same processing method as other uplink transmission scheduled by the PDCCH. The PRACH transmitted spontaneously by the UE may be processed based on the UE requirements. For example, if the UE receives a downlink dynamic scheduling or semi-persistent scheduling, and the downlink reception indicated by it completely or partially overlaps with the RACH opportunity (RO), then if the UE needs to transmit a PRACH. For example, due to the uplink de-synchronization and other reasons, the UE may transmit the PRACH without performing the downlink reception. Even if the UE performs the downlink transmission, the uplink channel transmitted cannot be received by the base station correctly. In addition, different processing methods may be used for dynamic scheduled downlink reception and semi-persistent scheduled downlink reception. As shown in rules (A) above, the priority of dynamically scheduled downlink reception may be higher than that of the PRACH transmission. The priority of semi-persistent scheduled downlink reception may be lower than that of the PRACH transmission, etc.

In addition, for downlink PDSCH reception not performed due to the uplink transmission, the UE may transmit a NACK at corresponding positions. Or the UE attempts to decode part of the PDSCH according to its own processing mode, and feeds back an ACK or a NACK according to the decoding result. This enables the base station to retransmit the PDSCH. In particular, for a TDD system, the several symbols before RO cannot be configured as downlink. Then, the several symbols before the PRACH to be transmitted by the RO or the UE may be equally processed with the same priority as that of the PRACH.

In the case of configured PDCCH search space or COREST overlapping with the PRACH, similar processing may be adopted by referring to other dynamically configured or semi-persistently configured downlink receptions.

In a TDD system, the UE is not expected to be configured as both uplink and downlink by the base station on the same set of symbols, especially through dynamic scheduling. However, for the UE of HD-FDD, the priority of the uplink transmission and downlink reception may be indicated in DCI or semi-persistent configuration. If the two directions are configured at the same time, the UE may select the high priority direction to transmit or receive. Alternatively, it may be considered that the priority of the data indicated by the later scheduled DCI is higher.

For another example, the base station may separately configure for an HD-FDD UE the uplink and downlink symbol configuration similar to that configured for the TDD system through the RRC, and/or the symbol direction that may be dynamically configured. Then for the reception and transmission of HD-FDD, the same priority as TDD may be followed. For the interval required for conversion time, an additional set of rules may be defined. For example, methods such as discarding the last symbols of the uplink transmission, discarding the last symbols of the downlink reception, discarding the first symbols of the downlink reception, discarding the first symbols of the uplink transmission, etc. If both are transmission or reception, the last symbols of the previous transmission or reception are discarded.

If discarding proceeds to the location where the DMRS symbol is located, then the DMRS is shifted to the location of the first or last symbol that is not discarded. This ensures the possibility that the transmission or transmission block is decoded.

In an FDD system, the base station may configure dynamic SFI for the UE. Among them, the first several SFIs indicate the direction of the downlink slot, and the last several SFIs indicate the direction of the uplink slot. The number of SFIs specifically used to indicate the directions of the uplink and downlink slots is determined according to the subcarrier spacing of the uplink and downlink. For the UE of HD-FDD, since only the uplink transmission or the downlink reception may be performed at the same time, then, for an HD-FDD UE operating on FDD, the base station may only configure some indications of SFI, which are applicable to both uplink and downlink. The reference subcarrier spacing for the SFI indications may be predefined as an uplink or downlink subcarrier spacing, or a smaller or larger one of the uplink subcarrier spacing and the downlink subcarrier spacing may be selected as the reference subcarrier spacing. Selecting the larger one of the uplink and downlink subcarrier spacings as the reference subcarrier spacing may reduce the signaling overhead because the corresponding symbol length is longer. Selecting the smaller one of the uplink and downlink subcarrier spacings as the reference subcarrier spacing may indicate more precisely.

If for the UE of HD-FDD, if the SFI indications of the existing FDD are still used, that is, respectively indicating for the uplink and downlink, the uplink and downlink cannot be both configured for the UE for one symbol or one set of symbols. The symbol configured as flexible according to the SFI configuration, which is uplink or downlink, it may be decided whether to transmit or receive on the symbol according to the existing rules. For example, if configured as flexible, the existing semi-persistent transmission or downlink reception will be cancelled. Or it is determined to receive the semi-persistent downlink except the PDCCH and PRS.

(e3) Setting the channel transmission based on the priority between at least one time interval and the transmission channels of the UE The priority between at least one time interval and the channel transmission of the UE may be determined by predefined rules.

Since uplink and downlink switching requires a certain time interval, the time interval also needs to have a certain priority. Then, the time interval may be predefined or configured by the base station to be inserted in one or more of the following positions: before the uplink channel transmission, after the uplink channel transmission, before the downlink channel reception, and after the downlink channel reception. In addition, the base station may reserve enough time interval for uplink and downlink switching by scheduling. In addition, the previous methods f1 and f2 are equally applicable at this time.

Specifically, one or more of the following rules, for example, may be applied:
  Creating or inserting the interval before and/or after the dynamically scheduled uplink transmission;
    If there are semi-persistent downlink receptions (such as one or more of DL SPS, PDCCH, and downlink measuring) on the interval, no downlink reception will be performed.
  Creating or inserting the interval before and/or after the downlink reception of the dynamic scheduling;
    If there are semi-persistent uplink transmissions (such as one or more of CG, UCI of DL SPS, and semi-persistent SRS) on the interval, no uplink transmission is performed.
  If a semi-persistently scheduled uplink transmission is performed on a symbol, the interval is created or inserted before and/or after the transmission;
    If it is a semi-persistent downlink reception before and after the uplink transmission, no downlink reception is performed.
    If it is a dynamic downlink reception before and after the uplink transmission, the interval is created by discarding certain symbols of uplink transmission and not transmitting.
  If the UE needs to receive SSB at the interval time, the UE may ignore uplink scheduling. Or, if the UE receives the uplink scheduling, it does not require the UE to receive the SSB at the interval time.

As shown in FIG. 6E, the UE needs to transmit the PUSCH (the PUSCH is semi-persistently or dynamically configured), and adds the interval X after the PUSCH. In the interval X, the UE does not listen to the PDCCH of PDCCH1, but the UE may listen to the PDCCH2 after the interval X.

Specifically, for example, if there is no dynamic scheduling, the UE obtains the following priority according to the predefined rules or the base station configurations: the UCI of the HARQ-ACK carrying the high priority DL SPS/CG UL of high priority, and the priority of the interval time before transmitting the PUSCH is higher than the PDCCH monitoring/the downlink measuring. That is, no downlink PDCCH monitoring or downlink measuring is performed from the beginning of the interval X before uplink transmission. Similarly, after interval X after the uplink signal transmission, the downlink PDCCH monitoring/downlink measuring is not performed either. For the PDCCH monitoring, the whole PDCCH CORESET with overlapping parts is not performed.

(e4) determining a method of consecutive reception or transmission according to the configuration For a TDD system, the base station will configure the UE with a cell specific or UE specific slot format. As mentioned above, the UE will decide whether to perform uplink transmission or downlink reception according to the slot format. However, for an HD-FDD UE, if the uplink transmission or downlink reception is directly scheduled for a consecutive period of time, the UE may be caused to have to cancel some transmission or reception. Therefore, a pattern of valid symbols or a slots may be configured for the user. The valid pattern may interrupt the consecutive transmission or reception, and receive from or transmit to the opposite side according to other configurations. For example, if the UE has been keeping performing uplink transmission, the base station cannot stop the uplink transmission. If some uplink transmissions can be interrupted, the UE may return to the downlink to monitor the PDCCH or perform operations such as synchronization or downlink measurement and the like. For example, the UE may listen to paging messages, or when an emergency downlink channel arrives, the base station may stop the uplink transmission of the current UE by way of DCI, etc.

Specifically, the base station may configure one or more groups of valid patterns for the UE through the RRC. Among them, valid patterns may be configured for the uplink and downlink respectively. In order to make the configuration more dynamic, valid patterns may be turned on or off dynamically in the DCI, or one or more groups of valid patterns may be indicated dynamically. Similarly, the valid patterns may be indicated in the MAC.

The valid pattern may be similar to the uplink and downlink slot configuration in a TDD system. However, configuration for the uplink and the downlink is performed respectively, instead of only needing one set of configurations like the case in the TDD system. The advantage of configuring uplink and downlink separately is that it may achieve more flexible scheduling by combining dynamic and semi-persistent scheduling. The valid pattern may combine the semi-persistent or dynamic scheduling to determine whether to cancel the semi-persistent scheduling. For example, the UE determines whether to perform uplink transmission or downlink reception on one or more symbols or slots according to the valid pattern configured by the base station and the semi-persistent configuration. Further, it may be considered that the uplink transmission of the uplink symbol indicated as invalid is cancelled or is not a valid configuration. The repetition mode of the PUSCH may also be determined according to the valid pattern, similar to the type B repetition of the PUSCH, the invalid uplink symbol will be split into two actual repetitions. A similar method may be used for the downlink. For the PDCCH, it may be defined that detections on both invalid and valid symbols are possible, or only detections on valid symbols are possible. That is to say, different processing methods are adopted for different channels and signals for the valid symbols. Alternatively, it may be different from the slot format configured in a TDD system, and the valid pattern will not change the uplink and downlink directions. Valid patterns may also be used or not used for cancellation of the transmission or reception semi-persistently configured.

In method 2 of case B, if the scheduling indicated in the RAR has no effect on the transmission of Msg3/5 (taking Msg3 as an example, the uplink grant of Msg3 is transmitted in the RAR), for example, the UE may report the UE capabilities in Msg3 and/or Msg5 according to the predefined rules or the base station configurations, then after that, the base station may further distinctively schedule according to the UE capabilities of the UE in the UE specific RCC messages. Since the base station obtains the UE capabilities through Msg3 and/or Msg5, the base station may configure physical resources to the UE that are suitable for its capabilities. The physical resources may be, but are not limited to, for example, different PDCCH search spaces, and/or different CORESETs, etc.

If the scheduling indicated in the RAR in method 2 of case B affects the transmission of Msg3/5 (taking Msg3 as an example, the uplink grant of Msg3 is transmitted in the RAR), then the base station may continue to perform scheduling (the same or different) for multiple UEs based on the predefined method without knowing the capabilities of the UE. The predefined method may be steps 501-503 in case B.

The method performed by the UE is described above in connection with FIG. 5. In the example of FIG. 5, the descriptions with respect to a random access request and a random access response are made. However, the method in FIG. 5 may also be implemented through other messaging processes. That is, the random access request may be replaced with a "first message", and the first message may also be other messages such as Msg3/5. The random access response may be replaced with a "second message", and the second message may also be the UE specific RRC messages such as a RRC complete message, etc. Among them, the UE specific related parameters are configured in the UE specific RRC messages.

Figure 7:
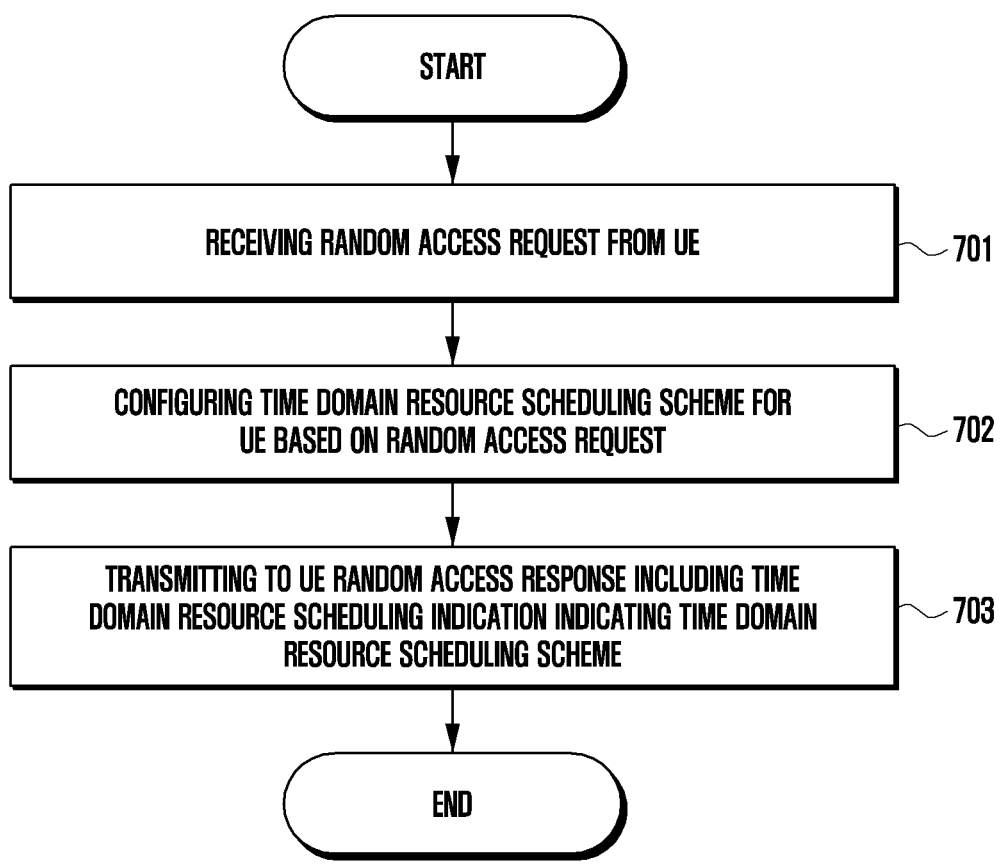
FIG. 7 illustrates a method performed by a base station in a wireless communication system according to an embodiment of the disclosure.

FIG. 7 illustrates a method performed by a base station in a wireless communication system.

Referring to FIG. 7, in step 701, the base station receives a random access response from the UE.

In step 702, the base station configures a time domain resource scheduling scheme for the UE based on the random access response. The base station also configures a time domain resource scheduling scheme for the UE considering the UE capabilities.

In step 703, the base station transmits to the UE a random access response including a time domain resource scheduling indication indicating the time domain resource scheduling scheme.

The above steps 701-703 correspond to the operations performed by the base station described in the above steps 501-503, and will not be repeated here.

The method performed by the base station is described above in connection with FIG. 7. In the example of FIG. 7, the descriptions with respect to the random access request and random access response are described. However, the method in FIG. 7 may also be implemented through other messaging processes. That is, the random access request may be replaced with a "first message", and the first message may also be other messages such as Msg3/5. The random access response may be replaced with a "second message", and the second message may also be the UE specific RRC messages such as the RRC complete message, etc. Among them, the UE specific related parameters are configured in the UE specific RRC message.

The method described herein may improve the efficiency of UEs with different UE capabilities when working in the same base station or cell, reduce or eliminate the impact on high-capacity UEs, and ensure the performance of different UE capabilities when satisfying the UE capabilities.

Figure 8:
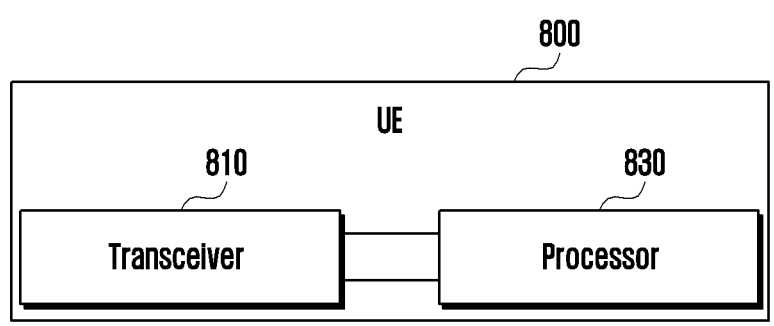
FIG. 8 illustrates a structure of a user equipment (UE) according to an embodiment of the disclosure.

FIG. 8 is a block diagram showing the structure of a user device (UE) according to an embodiment of the disclosure.

Referring to FIG. 8, the UE 800 includes a transceiver 810 and a processor 830. The transmitter 810 may be configured to transmit signals outward and/or receive signals from the outside. The processor 830 may be configured to control the transceiver to transmit connection assistance information to a base station different from the UE 800. The UE 800 may be implemented in the form of hardware, software or a combination of hardware and software so that it may perform any one or more steps of any method described in the disclosure.

Figure 9:
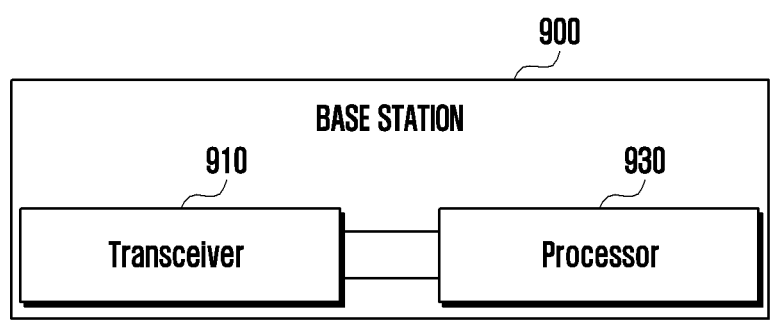
FIG. 9 illustrates a structure of a base station according to an embodiment of the disclosure.

FIG. 9 is a block diagram showing the structure of a base station according to an embodiment of the disclosure.

Referring to FIG. 9, the base station 900 includes a transceiver 910 and a processor 930. The transmitter 910 may be configured to transmit signals outward and/or receive signals from the outside. The processor 930 may be configured to control the transceiver to receive connection assistance information from the UE 800 different from the base station 900. The base station 900 may be implemented in the form of hardware, software or a combination of hardware and software so that it may perform any one or more steps of any method described in the disclosure.

Various embodiments of the disclosure may be implemented as computer readable codes embodied on a computer readable recording medium from a specific perspective. The computer readable recording medium is any data storage device that may store data readable by a computer system. Examples of the computer-readable recording medium may include read only memory (ROM), random access memory (RAM), optical disk read only memory (CD-ROM), magnetic tape, floppy disk, optical data storage device, carrier (e.g., data transmission via the Internet), and the like. The computer readable recording medium may be distributed through computer systems connected via a network, and thus the computer readable codes may be stored and performed in a distributed manner. Moreover, functional programs, codes, and code segments for implementing various embodiments of the disclosure may be easily interpreted by those skilled in the art to which the embodiments of the disclosure are applied.

It will be understood that embodiments of the disclosure may be implemented in hardware, software, or combination of hardware and software. The software may be stored as program indications or computer readable codes executable on a processor on a non-transitory computer readable medium. Examples of the non-transitory computer readable recording medium include magnetic storage media (e.g., ROM, floppy disk, hard disk, etc.) and optical recording media (e.g., CD-ROM, digital video disk (DVD), etc.). The non-transitory computer readable recording medium may also be distributed across network-coupled computer systems such that the computer readable codes are stored and performed in a distributed manner. The medium may be read by a computer, stored in a memory, and performed by a processor. Various embodiments may be implemented by a computer or a portable terminal including a controller and a memory, and the memory may be an example of a non-transitory computer readable recording medium adapted to store a program(s) having indications to implement embodiments of the disclosure. The disclosure may be implemented by a program having codes for implementing the apparatuses and methods described in the claims, which is stored in a machine (or computer) readable storage medium. The program may be electronically carried on any medium, such as a communication signal transmitted via a wired or wireless connection, and the disclosure suitably includes equivalents thereof.

According to one aspect of the disclosure, a method performed by a user device (UE) in a wireless communication system is provided, which includes: transmitting a first message to the base station; receiving a second message responding to the first message from the base station; parsing a time domain resource scheduling indication in the second message, obtaining a time domain resource scheduling scheme configured by the base station for the UE; and setting channel transmissions of the UE based on the time domain resource scheduling scheme.

Optionally, the step of transmitting the first message to the base station includes: in the case that the first message contains information on the UE capabilities of the UE, the UE includes information on the UE capabilities of the UE in the first message in one of the following ways: based on the mapping relationship predefined or pre-configured by the base station between the UE capabilities and the resources for transmitting the first message, the UE transmits the first message through the resources for transmitting the first message, to which the UE capabilities of the UE are mapped; and the UE includes the UE capabilities of the UE in the uplink channel in the first message.

Optionally, the UE capabilities includes at least one of the following: the duplex mode, the uplink and downlink transition time, the retuning time, the PUSCH additional delay time, the PDSCH additional delay time, the PUCCH additional delay time, the time from PDCCH scheduling to PUSCH transmission, the time from PDCCH scheduling to PDSCH reception, the time from PDSCH reception to ACK/NACK feedback, the time from CSI triggering to reporting, the time from CSI measuring to reporting, the polarization type of UE antennas, the number of UE antennas.

Optionally, wherein, in the case that the first message contains information on the UE capabilities of the UE, based on the mapping relationship predefined or pre-configured by the base station between the UE capabilities and the resources for receiving the second message, the UE receives the second message through the resources for receiving the second message, to which the UE capabilities of the UE are mapped, and/or in the case that the first message does not contain information on the UE capabilities of the UE, receive the second message by one of the following ways: based on the mapping relationship between the UE capabilities and the resources for receiving the second message, the UE receives the second message through the resources for receiving the second message, to which the UE capabilities of the UE are mapped; and based on the mapping relationship between the UE capabilities and the resources for receiving the second message, the UE receives the second message through the resources for receiving the second message, to which the worst UE capabilities predefined or supported by the base station configurations are mapped, and wherein, the resources for receiving the second message are at least one of the start position of the second message window, the length of the second message window, the RNTI for descrambling the second message, the PDCCH search space, and the control resource set CORESET.

Optionally, the steps for the UE to parse the time domain resource scheduling indication in the second message include: the UE determines a time domain resource scheduling table for parsing the time domain resource scheduling indication, and parses the time domain resource scheduling indication by the determined time domain resource scheduling table, and, in the case that the first message contains information on the UE capabilities of the UE, the UE determines the time domain resource scheduling table for parsing the time domain resource scheduling indication in one of the following ways: the UE determines the time domain resource scheduling table to which the UE capabilities of the UE are mapped as the time domain resource scheduling table for parsing the time domain resource scheduling indication based on the mapping relationship predefined or pre-configured by the base station between the UE capabilities and the time domain resource scheduling tables; and the UE obtains the indication of the time domain resource scheduling table from the second message and determines the indicated time domain resource scheduling table as the time domain resource scheduling table for parsing the time domain resource scheduling indication, and/or in the case that the first message does not contain information on UE capabilities, UE determines a time domain resource scheduling table for parsing the time domain resource scheduling indication by one of the following ways: the UE determines the time domain resource scheduling table to which the worst UE capabilities predefined or supported by the base configurations are mapped as the time domain resource scheduling table for parsing the time domain resource scheduling indication based on the mapping relationship predefined or pre-configured by the base station between the UE capabilities and the time domain resource scheduling tables; the UE determines the time domain resource scheduling table to which the UE capabilities of the UE are mapped as the time domain resource scheduling table for parsing the time domain resource scheduling indication based on the mapping relationship predefined or pre-configured by the base station between the UE capabilities and the time domain resource scheduling tables; and the UE obtains the indication of the time domain resource scheduling table from the second message and determines the indicated time domain resource scheduling table as the time domain resource scheduling table for parsing the time domain resource scheduling indication.

Optionally, the second message is a random access response RAR.

Optionally, the time domain resource scheduling scheme includes at least one of the following: at least one time interval, priority between the at least one time interval and the channel transmission of UE, and priority between channel transmission of UE, and the at least one time interval includes at least one of the following: uplink and downlink transition time, PUSCH additional delay time, PDSCH additional delay time, PUCCH additional delay time, retuning time, time from PDCCH scheduling to PUSCH transmission, time from PDCCH scheduling to PDSCH reception, time from PDSCH reception to ACK/NACK feedback, time from CSI triggering to reporting time, time from CSI measuring to reporting, polarization type of UE antennas, number of UE antennas.

Optionally, the steps of setting channel transmission of the UE based on the time domain resource scheduling scheme include: the UE sets at least one time interval by one of the following methods: the UE sets at least one time interval between symbols in the transmission block of the channels, or the symbol of the UE in the transmission block of the channels is replaced with at least one time interval.

According to another aspect of the disclosure, a method performed by a base station in a wireless communication system communicating with a user device (UE) is provided, wherein the method includes: the base station receives the first message from the UE; the base station configures a time domain resource scheduling scheme for the UE based on the first message; the base station transmits a second message including a time domain resource scheduling indication indicating a time domain resource scheduling scheme to the UE, and wherein, the base station also takes into account the UE capabilities to configure a time domain resource scheduling scheme for the UE.

Optionally, the UE capabilities include at least one of the following: the duplex mode, the uplink and downlink transition time, the retuning time, the PUSCH additional delay time, the PDSCH additional delay time, the PUCCH additional delay time, the time from PDCCH scheduling to PUSCH transmission, the time from PDCCH scheduling to PDSCH reception, the time from PDSCH reception to ACK/NACK feedback, the time from CSI triggering to reporting, the time from CSI measuring to reporting, the polarization type of UE antennas, the number of UE antennas.

Optionally, in the case that the first message contains information on the UE capabilities of the UE, the steps of configuring a time domain resource scheduling scheme for UE based on the first message include: the base station determines the UE capabilities of the UE from the first message of the UE in one of the following ways: based on the mapping relationship predefined or pre-configured by the base station between the UE capabilities and the resources for transmitting the first message, the base station determines the UE capabilities of the UE through the transmission resource where the received first message transmitting the UE capabilities of the UE is; and the base station acquires the UE capabilities of the UE in the uplink channel included in the first message of the UE.

Optionally, in the case that the first message contains information on the UE capabilities of the UE, the steps of configuring a time domain resource scheduling scheme for the UE based on the first message also include: the base station configures the time domain resource scheduling scheme corresponding to the determined UE capabilities of the UE, and/or in the case that the first message does not contain information on the UE capabilities of the UE, the steps of the base station configuring the time domain resource scheduling scheme for the UE based on the first message also include one of the following: the base station configures the time domain resource scheduling scheme corresponding to the worst UE capabilities predefined or supported by the base station configurations; the base station configures for the UE all the time domain resource scheduling schemes predefined or supported by the base station configures corresponding to all the UE capabilities predefined or supported by the base station configurations.

Optionally, the steps of the base station transmitting the second message including the time domain resource scheduling indication indicating the time domain resource scheduling scheme to the UE also include: the base station generates a time domain resource scheduling indication, and wherein, the steps for the base station generating the time domain resource scheduling indication include: the base station determines the time domain resource scheduling table for generating the time domain resource scheduling indication; and the base station generates the time domain resource scheduling indication based on the determined time domain resource scheduling table, and wherein, the base station determines the time domain resource scheduling table used to generate the time domain resource scheduling indication by one of the following methods: based on the mapping relationship predefined or pre-configured by the base station between the UE capabilities and time domain resource scheduling table, the base station determines the time domain resource scheduling table to which the UE capabilities corresponding to the configured time domain resource scheme are mapped as the time domain resource scheduling table for generating the time domain resource scheduling indication; and the base station determines the time domain resource scheduling table predefined or pre-configured by the base station as the time domain resource scheduling table for generating the time domain resource scheduling indication, and, in which, in the case that the base station determines the time domain resource scheduling table predefined or pre-configured by the base station as the time domain resource scheduling table for generating the time domain resource scheduling indication, the second message also includes an indication for the time domain resource scheduling table predefined or pre-configured by the base station.

Optionally, the steps of the base station transmitting the second message including the time domain resource scheduling indication indicating the time domain resource scheduling scheme to the UE include: based on the mapping relationship predefined or pre-configured by the base station between the UE capabilities and the resources for transmitting the second message, the base station transmits the second message through the resources for transmitting the second message, to which the UE capabilities corresponding to the configured time domain resource scheme are mapped, and wherein, the resources for transmitting the second message are the start position of the second message window, the length of the second message window, RNTI for disturbing the second message, the PDCCH search space, and the control resource set CORESET.

Optionally, the second message is a random access response RAR.

Optionally, the time domain resource scheduling scheme includes at least one of the following items: at least one time interval, priority between the at least one time interval and the channel transmission of UE, and priority between channel transmission of UE, and wherein the at least one time interval includes at least one of the following items: uplink and downlink transition time, PUSCH additional delay time, PDSCH additional delay time, PUCCH additional delay time, retuning time, time from PDCCH scheduling to PUSCH transmission, time from PDCCH scheduling to PDSCH reception, time from PDSCH reception to ACK/NACK feedback, time from CSI triggering to reporting time, time from CSI measuring to reporting, polarization type of UE antennas, number of UE antennas.

According to another aspect of the disclosure, a user equipment UE in a wireless communication network is provided, which includes: a transceiver configured to transmit and receive signals with the outside; and a processor configured to control the transceiver to perform: transmitting a first message to a base station; receiving a second message in response to the first message from the base station; and parsing a time domain resource scheduling indication in the second message, obtaining a time domain resource scheduling scheme configured by the base station for the UE, and setting the channel transmission of the UE based on the time domain resource scheduling scheme.

According to still another aspect of the disclosure, there is provided a base station in a wireless communication network, which includes: a transceiver configured to transmit and receive signals with the outside; and a processor configured to control the transceiver to perform: receiving a first message from a UE; configuring a time domain resource scheduling scheme for the UE based on the first message; and transmitting to the UE a second message including a time-domain resource scheduling indication indicating the time domain resource scheduling scheme, and wherein, the base station configures the time domain resource scheduling scheme for the UE considering the UE capabilities.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) operating with a half-duplex frequency division duplex (HD-FDD) in a wireless communication system, the method comprising:
   receiving, from a base station, a configuration for an uplink transmission via a higher layer signaling;
   identifying a set of symbols for synchronization signals (SS) and a physical broadcast channel (PBCH) forming a SS/PBCH block based on SS/PBCH information received via the higher layer signaling;
   identifying a time interval for uplink and downlink switching, the time interval starting after a last symbol of the uplink transmission;
   based on an identification that (i) the configuration for the uplink transmission configures a transmission of a physical uplink shared channel (PUSCH) and (ii) at least one symbol of the set of symbols for the SS/PBCH block is included in the time interval for uplink and downlink switching, receiving the SS/PBCH block on the set of symbols and skipping the transmission of the PUSCH; and
   based on an identification that (i) the configuration for the uplink transmission configures a transmission of a sounding reference signal (SRS) and (ii) the at least one symbol of the set of symbols for the SS/PBCH block is included in the time interval for uplink and downlink switching, receiving the SS/PBCH block on the set of symbols and performing the transmission of the SRS by skipping a transmission of the SRS on at least one symbol that is within the time interval and before the set of symbols for the SS/PBCH block.

2. The method of claim 1, further comprising:
   receiving, from the base station, scheduling information for a downlink signal via the higher layer signaling;
   receiving, from the base station, downlink control information scheduling a physical random access channel (PRACH); and
   in case that the downlink signal and the PRACH at least partially overlap in a time resource, skipping a reception of the downlink signal.

3. The method of claim 1, further comprising:
   transmitting, to the base station, capability information, wherein the capability information indicates that the UE operates with the HD-FDD.

4. A method performed by a base station in a wireless communication system, the method comprising:
   transmitting, to a user equipment (UE) operating with a half-duplex frequency division duplex (HD-FDD), synchronization signals and a physical broadcast channel (SS/PBCH) information via a higher layer signaling, the SS/PBCH information including information indicating a set of symbols for a SS/PBCH block;
transmitting, to the UE, a configuration for an uplink transmission via the higher layer signaling;
in case that (i) the configuration for the uplink transmission configures a transmission of a physical uplink shared channel (PUSCH) and (ii) at least one symbol of the set of symbols for the SS/PBCH block is included in a time interval that is for uplink and downlink switching and starts after a last symbol of the uplink transmission, transmitting the SS/PBCH block on the set of symbols and skipping a reception of the PUSCH; and
in case that (i) the configuration for the uplink transmission configures a transmission of a sounding reference signal (SRS) and (ii) the at least one symbol of the set of symbols for the SS/PBCH block is included in the time interval for uplink and downlink switching, transmitting the SS/PBCH block on the set of symbols and receiving the SRS by skipping a reception of the SRS on at least one symbol that is within the time interval and before the set of symbols for the SS/PBCH block.

5. The method of claim 4, further comprising:
transmitting, to the UE, scheduling information for a downlink signal via the higher layer signaling;
transmitting, to the UE, downlink control information scheduling a physical random access channel (PRACH); and
in case that the downlink signal and the PRACH at least partially overlap in a time resource, skipping a transmission of the downlink signal.

6. The method of claim 4, further comprising:
receiving, from the UE, capability information,
wherein the capability information indicates that the UE operates with the HD-FDD.

7. A user equipment (UE) operating with a half-duplex frequency division duplex (HD-FDD) in a wireless communication system, the UE comprising:
a transceiver; and
a processor configured to:
receive, from a base station, a configuration for an uplink transmission via a higher layer signaling,
identify a set of symbols for synchronization signals (SS) and a physical broadcast channel (PBCH) forming a SS/PBCH block based on SS/PBCH information received via the higher layer signaling,
identify a time interval for uplink and downlink switching, the time interval starting after a last symbol of the uplink transmission,
based on an identification that (i) the configuration for the uplink transmission configures a transmission of a physical uplink shared channel (PUSCH) and (ii) at least one symbol of the set of symbols for the SS/PBCH block is included in the time interval for uplink and downlink switching, receive the SS/PBCH block on the set of symbols and skip the transmission of the PUSCH, and
based on an identification that (i) the configuration for the uplink transmission configures a transmission of a sounding reference signal (SRS) and (ii) the at least one symbol of the set of symbols for the SS/PBCH block is included in the time interval for uplink and downlink switching, receive the SS/PBCH block on the set of symbols and perform the transmission of the SRS by skipping a transmission of the SRS on at least one symbol that is within the time interval and before the set of symbols for the SS/PBCH block.

8. The UE of claim 7, wherein the processor is further configured to:
receive, from the base station, scheduling information for a downlink signal via the higher layer signaling,
receive, from the base station, downlink control information scheduling a physical random access channel (PRACH), and
in case that the downlink signal and the PRACH at least partially overlap in a time resource, skip a reception of the downlink signal.

9. The UE of claim 7, wherein the processor is further configured to:
transmit, to the base station, capability information,
wherein the capability information indicates that the UE operates with the HD-FDD.

10. A base station in a wireless communication system, the base station comprising:
a transceiver; and
a processor configured to:
transmit, to a user equipment (UE) operating with a half-duplex frequency division duplex (HD-FDD), synchronization signals and a physical broadcast channel (SS/PBCH) information via a higher layer signaling, the SS/PBCH information including information indicating a set of symbols for a SS/PBCH block,
transmit, to the UE, a configuration for an uplink transmission via the higher layer signaling,
in case that (i) the configuration for the uplink transmission configures a transmission of a physical uplink shared channel (PUSCH) and (ii) at least one symbol of the set of symbols for the SS/PBCH block is included in a time interval that is for uplink and downlink switching and starts after a last symbol of the uplink transmission, transmit the SS/PBCH block on the set of symbols and skip a reception of the PUSCH, and
in case that (i) the configuration for the uplink transmission configures a transmission of a sounding reference signal (SRS) and (ii) the at least one symbol of the set of symbols for the SS/PBCH block is included in the time interval for uplink and downlink switching, transmit the SS/PBCH block on the set of symbols and receive the SRS by skipping a reception of the SRS on at least one symbol that is within the time interval and before the set of symbols for the SS/PBCH block.

11. The base station of claim 10, wherein the processor is further configured to:
transmit, to the UE, scheduling information for a downlink signal via the higher layer signaling,
transmit, to the UE, downlink control information scheduling a physical random access channel (PRACH), and
in case that the downlink signal and the PRACH at least partially overlap in a time resource, skip a transmission of the downlink signal.

12. The base station of claim 10, wherein the processor is further configured to:
receive, from the UE, capability information,
wherein the capability information indicates that the UE operates with the HD-FDD.

* * * * *